US011915689B1

(12) United States Patent
Agostinelli et al.

(10) Patent No.: US 11,915,689 B1
(45) Date of Patent: Feb. 27, 2024

(54) GENERATING AUDIO USING AUTO-REGRESSIVE GENERATIVE NEURAL NETWORKS

(71) Applicant: Google LLC, Mountain View, CA (US)

(72) Inventors: Andrea Agostinelli, Zurich (CH); Timo Immanuel Denk, Zurich (CH); Antoine Caillon, Paris (FR); Neil Zeghidour, Paris (FR); Jesse Engel, Orinda, CA (US); Mauro Verzetti, Dübendorf (CH); Christian Frank, Zurich (CH); Zalán Borsos, Zurich (CH); Matthew Sharifi, Kilchberg (CH); Adam Joseph Roberts, Durham, NC (US); Marco Tagliasacchi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/463,196

(22) Filed: Sep. 7, 2023

Related U.S. Application Data

(60) Provisional application No. 63/441,412, filed on Jan. 26, 2023, provisional application No. 63/404,528, filed on Sep. 7, 2022.

(51) Int. Cl.
*G06F 40/30* (2020.01)
*G10L 15/16* (2006.01)
(Continued)

(52) U.S. Cl.
CPC ........... *G10L 15/16* (2013.01); *G10H 1/0008* (2013.01); *G10L 15/063* (2013.01);
(Continued)

(58) Field of Classification Search
CPC ... G10L 15/16; G10L 15/063; G10L 15/1815; G10L 15/22; G10L 25/30; G10H 1/0008;
(Continued)

(56) References Cited

U.S. PATENT DOCUMENTS 9,190,054 B1   11/2015 Riley et al.
11,024,288 B2   6/2021 McCallum
(Continued)

OTHER PUBLICATIONS

Abu-El-Haija et al., "Youtube-8m: A large-scale video classification benchmark," Submitted on Sep. 27, 2016, arXiv:1609.08675, 10 pages.
(Continued)

*Primary Examiner* — Jakieda R Jackson
(74) *Attorney, Agent, or Firm* — Fish & Richardson P.C.

(57) ABSTRACT

Methods, systems, and apparatus, including computer programs encoded on computer storage media, for generating a prediction of an audio signal. One of the methods includes receiving a request to generate an audio signal conditioned on an input; processing the input using an embedding neural network to map the input to one or more embedding tokens; generating a semantic representation of the audio signal; generating, using one or more generative neural networks and conditioned on at least the semantic representation and the embedding tokens, an acoustic representation of the audio signal; and processing at least the acoustic representation using a decoder neural network to generate the prediction of the audio signal.

30 Claims, 8 Drawing Sheets

(51) Int. Cl.
  *G10L 15/18* (2013.01)
  *G10H 1/00* (2006.01)
  *G10L 15/06* (2013.01)
(52) U.S. Cl.
  CPC .... *G10L 15/1815* (2013.01); *G10H 2210/056* (2013.01); *G10H 2250/311* (2013.01)
(58) Field of Classification Search
  CPC ........ G10H 2210/056; G10H 2250/311; G06F 40/30
  See application file for complete search history.

(56) References Cited

U.S. PATENT DOCUMENTS

| | | | |
|---|---|---|---|
| 11,410,684 | B1 | 8/2022 | Klimkov et al. |
| 11,551,663 | B1 | 1/2023 | Bissell et al. |
| 11,580,145 | B1 | 2/2023 | Kumar et al. |
| 11,645,947 | B1 | 5/2023 | Blair et al. |
| 2013/0339035 | A1 | 12/2013 | Chordia et al. |
| 2015/0120308 | A1 | 4/2015 | Leistikow et al. |
| 2017/0103752 | A1 | 4/2017 | Senior et al. |
| 2020/0051583 | A1 | 2/2020 | Wu et al. |
| 2020/0075019 | A1 | 3/2020 | Steelberg et al. |
| 2020/0110803 | A1 | 4/2020 | Djalali et al. |
| 2021/0065712 | A1 | 3/2021 | Holm |
| 2021/0074266 | A1 | 3/2021 | Lu et al. |
| 2021/0098098 | A1 | 4/2021 | Pinto |
| 2021/0117624 | A1* | 4/2021 | Aghajanyan ............ H04L 51/02 |
| 2021/0280165 | A1 | 9/2021 | Yu et al. |
| 2021/0383789 | A1 | 12/2021 | Donahue et al. |
| 2023/0013370 | A1 | 1/2023 | Li et al. |
| 2023/0017503 | A1 | 1/2023 | Moritz et al. |
| 2023/0020621 | A1 | 1/2023 | Rios |
| 2023/0058447 | A1 | 2/2023 | Rosenberg et al. |
| 2023/0075891 | A1 | 3/2023 | Zheng et al. |
| 2023/0096805 | A1 | 3/2023 | Kim et al. |
| 2023/0269291 | A1 | 8/2023 | Ramadas et al. |

OTHER PUBLICATIONS

Agustsson et al., "Soft-To-Hard Vector Quantization for End-to-End Learning Compressible Representations," presented at NIPS'17: Proceedings of the 31st International Conference on Neural Information Processing Systems, Long Beach, California, Dec. 4-9, 2017, 11 pages.
Baevski et al., "vq-wav2vec: Self-supervised learning of discrete speech representations," Submitted on Oct. 12, 2019, arXiv: 1910.05453, 12 pages.
Baevski et al., "wav2vec 2.0: A Framework for Self-Supervised Learning of Speech Representations," Submitted on Jun. 20, 2020, arXiv:2006.11477, 12 pages.
Binkowski et al., "High Fidelity Speech Synthesis with Adversarial Networks," Submitted on Sep. 25, 2019, arXiv: 1909.11646, 15 pages.
Borsos et al., "A Language Modeling Approach to Audio Generation," Submitted on Jun. 21, 2023, arXiv:2209.03143, 11 pages.
Brown et al., "Language Models Are Few-Shot Learners," Submitted on May 28, 2020, arXiv:2005.14165, 25 pages.
Carlini et al., "Extracting Training Data From Large Language Models," presented at the 30th USENIX Security Symposium (USENIX Security 21), held virtually, Aug. 11-13, 2021, 19 pages.
Carlini et al., "Quantifying Memorization Across Neural Language Models," Submitted on Feb. 15, 2022, arXiv:2202.07646, 19 pages.
Casanova et al., "Towards Zero-Shot Multi-Speaker TTS and Zero-Shot Voice Conversion for Everyone," presented at the 39th International Conference on Machine Learning, Baltimore, Maryland, Jul. 17-23, 2022, 12 pages.
Chen et al., "Evaluating Large Language Models Trained on Code," Submitted on Jul. 7, 2021, arXiv:2107.03374, 35 pages.
Chen et al., "Wavegrad: Estimating Gradients for Waveform Generation," Submitted on Sep. 2, 2020, arXiv:2009.00713, 15 pages.
Chinen et al., "ViSQOL v3: An Open Source Production Ready Objective Speech and Audio Metric," presented at the 12th International Conference on Quality of Multimedia Experience (QoMEX), Athlone, Ireland, May 26-28, 2020, 6 pages.
Choromanski et al., "Rethinking Attention with Performers," Submitted on Sep. 30, 2023, arXiv:2009.14794, 38 pages.
Chowdhery et al., "PaLM: Scaling Language Modeling with Pathways," Submitted on Apr. 5, 2022, arXiv:2204.02311, 87 pages.
Chung et al., "W2v-bert: Combining Contrastive Learning and Masked Language Modeling for Self-Supervised Speech Pre-Training," Submitted on Dec. 15, 2021, arXiv:2108.06209, 7 pages.
Conneau et al., "Xtreme-s: Evaluating Cross-Lingual Speech Representations," Submitted on Mar. 21, 2022, arXiv:2203.10752, 13 pages.
Cuturi, "Sinkhorn Distances: Lightspeed Computation of Optimal Transport," Submitted on Jun. 3, 2013, arXiv: 1306.0895, 9 pages.
Defferrard et al., "FMA: A Dataset for Music Analysis," Submitted on Dec. 6, 2016, arXiv: 1612.01840, 8 pages.
Défossez et al., "High Fidelity Neural Audio Compression," Submitted on Oct. 24, 2022, arXiv:2210.13438, 19 pages.
Delgado et al., "ASVspoof 2021: Automatic Speaker Verification Spoofing and Countermeasures Challenge Evaluation Plan," Submitted on Sep. 1, 2021, arXiv:2109.00535, 13 pages.
Devlin et al., "Bert: Pre-Training of Deep Bidirectional Transformers for Language Understanding, " Submitted on Oct. 11, 2018, arXiv:1810.04805, 16 pages.
Dhariwal et al., "Jukebox: A Generative Model for Music," Submitted on Apr. 30, 2020, arXiv:2005.00341, 20 pages.
Dosovitskiy et al., "An Image is Worth 16x16 Words: Transformers for Image Recognition at Scale, " Submitted on Oct. 22, 2020, arXiv:2010.11929, 22 pages.
Dunbar et al., "The Zero Resource Speech Challenge 2021: Spoken Language Modelling," Submitted on Apr. 29, 2021, arXiv:2104.14700, 5 pages.
Engel et al., "DDSP: Differentiable Digital Signal Processing," Submitted on Jan. 14, 2020, arXiv:2001.04643, 19 pages.
Esser et al., "Taming Transformers for High-Resolution Image Synthesis," presented at the Proceedings of the IEEE/CVF Conference on Computer Vision and Pattern Recognition, Nashville, Tennessee, Jun. 20-25, 2021, 11 pages.
Ge et al., "Long Video Generation with Time-Agnostic VQGAN and Time-Sensitive Transformer," Submitted on Oct. 23, 2022, arXiv:2204.03638, 30 pages.
Gemmeke et al., "Audio set: An Ontology and Human-Labeled Dataset for Audio Events," presented at the 2017 IEEE International Conference on Acoustics, Speech and Signal Processing (ICASSP), New Orleans, Louisiana, Mar. 5-9, 2017, 5 pages.
Github.com [online], "MubertAI/Mubert-Text-To-Music," May 25, 2023, retrieved on Oct. 3, 2023, retrieved from URL <https://github.com/MubertAI/Mubert-Text- to-Music>, 1 page.
Gong et al., "Ast: Audio spectrogram transformer," Submitted on Jul. 8, 2021, arXiv:2104.01778, 5 pages.
Goodfellow et al., "Generative Adversarial Networks," Submitted on Jun. 10, 2014, arXiv: 1406.2661, 9 pages.
Gulati et al., "Conformer: Convolution-Augmented Transformer for Speech Recognition," Submitted on May 16, 2020, arXiv:2005.08100, 5 pages.
Hawthorne et al., "Enabling Factorized Piano Music Modeling and Generation with the MAESTRO Dataset," Submitted on Oct. 19, 2018, arXiv: 1810.12247, 12 pages.
Hawthorne et al., "General-Purpose, Long-Context Autoregressive Modeling with Perceiver AR," presented at the 39th International Conference on Machine Learning, Baltimore, Maryland, Jul. 17-23, 2022, 24 pages.
Hawthorne et al., "Multi-Instrument Music Synthesis with Spectrogram Diffusion," Submitted on Jun. 11, 2022, arXiv:2206.05408, 12 pages.
Hershey et al., "CNN Architectures for Large-Scale Audio Classification," presented at the 2017 IEEE International Conference on Acoustics, Speech and Signal Processing (ICASSP), New Orleans, Louisiana, Mar. 5-9, 2017, 5 pages.

(56) References Cited

OTHER PUBLICATIONS

Hines et al., "ViSQOL: An Objective Speech Quality Model," EURASIP Journal on Audio, Speech, and Music Processing, Dec. 2015, 13:1-18.

Ho et al., "Denoising Diffusion Probabilistic Models," Submitted on Jun. 19, 2020, arXiv:2006.11239, 12 pages.

Ho et al., "Video Diffusion Models," Submitted on Dec. 6, 2022, arXiv:2204.03458, 14 pages.

Hong et al., "Cogvideo: Large-Scale Pretraining for Text-to-Video Generation via Transformers," Submitted on May 29, 2022, arXiv:2205.15868, 15 pages.

Hsu et al., "HuBERT: How Much Can a Bad Teacher Benefit ASR Pre-Training?" presented at ICASSP 2021-2021 IEEE International Conference on Acoustics, Speech and Signal Processing (ICASSP), Toronto, Ontario, Jun. 6-11, 2021, 5 pages.

Hsu et al., "Self-Supervised Speech Representation Learning by Masked Prediction of Hidden Units," IEEE/ACM Transactions on Audio, Speech, and Language Processing, Oct. 26, 2021, 29:3451-3460.

Huang et al., "Mulan: A Joint Embedding of Music Audio and Natural Language," Sumibtted on Aug. 26, 2022, arXiv:2208.12415, 8 pages.

Huang et al., "Music transformer," Submitted on Sep. 12, 2018, arXiv:1809.04281, 14 pages.

Kahn et al., "Libri-Light: A Benchmark for ASR with Limited or No. Supervision," presented at ICASSP 2020-2020 IEEE International Conference on Acoustics, Speech and Signal Processing (ICASSP), Virtual Barcelona, Submitted May 4-8, 2020, 7 pages.

Kalchbrenner et al., "Efficient Neural Audio Synthesis," Submitted on Jul. 3, 2018, arXiv: 1802.08435, 10 pages.

Kankanahalli S., "End-to-End Optimized Speech Coding with Deep Neural Networks," presented at the 2018 IEEE International Conference on Acoustics, Speech and Signal Processing (ICASSP), Calgary, Alberta, Apr. 15-20, 2018, 5 pages.

Kharitonov et al., "Data Augmenting Contrastive Learning of Speech Representations in the Time Domain," presented at the 2021 IEEE Spoken Language Technology Workshop (SLT), held virtually, Jan. 19-22, 2021, 6 pages.

Kharitonov et al., "Text-Free Prosody-Aware Generative Spoken Language Modeling," Submitted on Sep. 7, 2021, arXiv:2109.03264, 16 pages.

Kharitonov et al., "textless-lib: A Library for Textless Spoken Language Processing," Submitted on Feb. 15, 2022, arXiv:2202.07359, 9 pages.

Kilgour et al., "Fréchet Audio Distance: A Reference-Free Metric for Evaluating Music Enhancement Algorithms," presented at INTERSPEECH 2019, the 20th Annual Conference of the International Speech Communication Association, Graz, Austria, Sep. 15-19, 2019, 5 pages.

Kim et al., "Audiocaps: Generating Captions for Audios in the Wild," presented at the Proceedings of the 2019 Conference of the North American Chapter of the Association for Computational Linguistics: Human Language Technologies, Minneapolis, Minnesota, Jun. 2-7, 2019, 14 pages.

Kong et al., "Diffwave: A Versatile Diffusion Model for Audio Synthesis," Submitted on Sep. 21, 2020, arXiv:2009.09761, 17 pages.

Kong et al., "HiFi-GAN: Generative Adversarial Networks for Efficient and High Fidelity Speech Synthesis," Advances in Neural Information Processing Systems, 2020, 33:17022-33.

Kreuk et al., "Audiogen: Textually Guided Audio Generation," Submitted on Sep. 30, 2022, arXiv:2209.15352, 16 pages.

Kumar et al., "Melgan: Generative Adversarial Networks for Conditional Waveform Synthesis," Advances in neural information processing systems, 2019, 32: 12 pages.

Lakhotia et al., "On Generative Spoken Language Modeling from Raw Audio," Transactions of the Association for Computational Linguistics, Dec. 6, 2021, 9:1336-54.

Lample et al., "Deep learning for symbolic mathematics," Submitted on Dec. 2, 2019, arXiv:1912.01412, 24 pages.

Liu et al., "ROBERTa: A Robustly Optimized Bert Pretraining Approach," Submitted on Jul. 26, 2019, arXiv: 1907.11692, 13 pages.

Nguyen et al., "Are Discrete Units Necessary for Spoken Language Modeling?," IEEE Journal of Selected Topics in Signal Processing, Aug. 23, 2022, 16(6): 1415- 23.

Nichol et al., "GLIDE: Towards Photorealistic Image Generation and Editing with Text-Guided Diffusion Models," Submitted on Dec. 20, 2021, arXiv:2112.10741, 20 pages.

Oord et al., "Neural Discrete Representation Learning," Submitted on Nov. 2, 2017, arXiv:1711.00937, 11 pages.

Oord et al., "Parallel WaveNet: Fast High-Fidelity Speech Synthesis," presented at the 35th International Conference on Machine Learning, Stockholm, Sweden, May 26-28, 2018, 9 pages.

Oord et al., "Representation Learning with Contrastive Predictive Coding, " Submitted on Jul. 10, 2018, arXiv: 1807.03748, 13 pages.

Oord et al., "WaveNet: A Generative Model for Raw Audio," Submitted on Sep. 12, 2016, arXiv: 1609.03499, 15 pages.

Panayotov et al., "Librispeech: An ASR Corpus Based on Public Domain Audio Books," presented at 2015 IEEE International Conference on Acoustics, Speech and Signal Processing (ICASSP), Brisbane, Queensland, Apr. 19-24, 2015, 5 pages.

Pasad et al., "Layer-Wise Analysis of a Self-Supervised Speech Representation Model," presented at the 2021 IEEE Automatic Speech Recognition and Understanding Workshop (ASRU), held Virtually, Dec. 13-17, 2021, 9 pages.

Peng et al., "Self-Supervised Representation Learning for Speech Using Visual Grounding and Masked Language Modeling," Submitted on Feb. 7, 2022, arXiv:2202.03543, 9 pages.

Petermann et al., "Hyper-Autoencoded Reconstruction Propagation for Scalable Neural Audio Coding," presented at the 2021 IEEE Workshop on Applications of Signal Processing to Audio and Acoustics (WASPAA), held Virtually, Oct. 17- 20, 2021, 5 pages.

Radford et al., "Learning Transferable Visual Models from Natural Language Supervision," presented at the International Conference on Machine Learning, held Virtually, Jul. 18-24, 2021, 16 pages.

Rae et al., "Scaling Language Models: Methods, Analysis & Insights from Training Gopher," Submitted on Dec. 8, 2021, arXiv:2112.11446, 120 pages.

Raffel et al., "Exploring the Limits of Transfer Learning with a Unified Text-to-Text Transformer," The Journal of Machine Learning Research, Jun. 1, 2020, 21(1): 67 pages.

Ramesh et al., "Hierarchical Text-Conditional Image Generation with Clip Latents," Submitted on Apr. 13, 2022, arXiv:2204.06125, 27 pages.

Ramesh et al., "Zero-Shot Text-to-Image Generation," presented at the International Conference on Machine Learning, held Virtually, Jul. 18-24, 2021, 11 pages.

Razavi et al., "Generating Diverse High-Fidelity Images with VQ-VAE-2," Advances in neural information processing systems, 2019, 32: 11 pages.

Riffusion.com [online] "[RIFFUSION] (noun): riff + diffusion," available on or before Dec. 15, 2022, via internet archive: Wayback Machine URL < http://web.archive.org/web/20221215132646/https://www.riffusion.com/about>, retrieved on Sep. 21, 2023, retrieved from URL < https://riffusion.com/about >, 13 pages.

Rivière et al., "Towards Unsupervised Learning of Speech Features in the Wild," presented at the 2021 IEEE Spoken Language Technology Workshop (SLT), held virtually, Jan. 19-22, 2021, 9 pages.

Roberts et al., "Scaling Up Models and Data with T5X and Seqio," Submitted on Mar. 31, 2022, arXiv:2203.17189, 12 pages.

Rombach et al., "High-Resolution Image Synthesis with Latent Diffusion Models," presented at the Proceedings of the IEEE/CVF Conference on Computer Vision and Pattern Recognition, New Orleans, Louisiana, Jun. 18-24, 2022, 12 pages.

Roy et al., "Efficient Content-Based Sparse Attention with Routing Transformers," Transactions of the Association for Computational Linguistics, Feb. 1, 2021, 9:53-68.

Saeed et al., "Contrastive Learning of General-Purpose Audio Representations," presented at the ICASSP 2021-2021 IEEE International Conference on Acoustics, Speech and Signal Processing (ICASSP), Toronto, Ontario, Jun. 6-11, 2021, 5 pages.

(56) References Cited

OTHER PUBLICATIONS

Saharia et al., "Photorealistic Text-to-Image Diffusion Models with Deep Language Understanding," Advances in Neural Information Processing Systems, Dec. 6, 2022, 35:36479-94.

Schatz et al., "Evaluating Speech Features with the Minimal-Pair ABX task: Analysis of the classical MFC/PLP pipeline," presented at INTERSPEECH 2013: 14th Annual Conference of the International Speech Communication Association, Lyon, France, Aug. 25-29, 2013, 197 pages.

Schatz, "ABX-Discriminability Measures and Applications," Cognitive Science, Universite Paris 6 (UMPC), 2016, 6 pages.

Schroff et al., "Facenet: A Unified Embedding for Face Recognition and Clustering," presented at the Proceedings of the IEEE Conference on Computer Vision and Pattern Recognition, Boston, Massachusetts, Jun. 7-12, 2015, 9 pages.

Shor et al., "Towards Learning a Universal Non-Semantic Representation of Speech," Submitted on Feb. 25, 2020, arXiv:2002.12764, 5 pages.

Tagliasacchi et al., "SEANet: A Multi-Modal Speech Enhancement Network," Submitted on Sep. 4, 2020, arXiv:2009.02095, 5 pages.

Tagliasacchi et al., "Self-Supervised Audio Representation Learning for Mobile Devices," Submitted on May 24, 2019, arXiv:1905.11796, 11 pages.

Thoppilan et al., "LaMDA: Language Models for Dialog Applications," Submitted on Jan. 20, 2022, arXiv:2201.08239, 47 pages.

van Niekerk et al., "Analyzing Speaker Information in Self-Supervised Models to Improve Zero-Resource Speech Processing," Submitted on Aug. 2, 2021, arXiv:2108.00917, 5 pages.

Vaswani et al., "Attention is All You Need," Advances in Neural Information Processing Systems, 2017, 30: 11 pages.

Villegas et al., "Phenaki: Variable Length Video Generation from Open Domain Textual Description," Submitted on Oct. 5, 2022, arXiv:2210.02399, 17 pages.

Wu et al., "Godiva: Generating open-domain videos from natural descriptions," Submitted on Apr. 30, 2021, arXiv:2104.14806, 12 pages.

Wu et al., "Nuwa-infinity: Autoregressive over autoregressive generation for infinite visual synthesis," Submitted on Jul. 20, 2022, arXiv:2207.09814, 23 pages.

Wu et al., "Visual Synthesis Pre-Training For Neural Visual World Creation," presented at the European Conference on Computer Vision, Tel Aviv, Israel, Oct. 23-27, 2022, 28 pages.

Wu et al., "Wav2clip: Learning Robust Audio Representations From Clip," presented at the ICASSP 2022-2022 IEEE International Conference on Acoustics, Speech and Signal Processing (ICASSP), Singapore, Singapore, May 23-27, 2022, 5 pages.

Yang et al., "Diffsound: Discrete Diffusion Model for Text-to-Sound Generation," Journal of Latex Class Files, Aug. 2021, 31(8):1-13.

Yu et al., "Scaling Autoregressive Models for Content-Rich Text-to-Image Generation," Submitted on Jun. 22, 2022, arXiv:2206.10789, 49 pages.

Yu et al., "Vector-Quantized Image Modeling with Improved VQGAN," Submitted on Oct. 9, 2021, arXiv:2110.04627, 17 pages.

Zeghidour et al., "LEAF: A Learnable Frontend for Audio Classification," Submitted on Jan. 21, 2021, arXiv:2101.08596, 16 pages.

Zeghidour et al., "Soundstream: An End-to-End Neural Audio Codec," IEEE/ACM Transactions on Audio, Speech, and Language Processing, Nov. 23, 2021, 30:495-507.

Zen et al., "Statistical Parametric Speech Synthesis Using Deep Neural Networks," presented at 2013 IEEE International Conference on Acoustics, Speech and Signal Processing, Vancouver, British Columbia, May 26-31, 2013, 5 pages.

Zhen et al., "Cascaded Cross-Module Residual Learning Towards Lightweight End- to-End Speech Coding," Submitted on Jun. 18, 2019, arXiv: 1906.07769, 5 pages.

* cited by examiner

GENERATING AUDIO USING AUTO-REGRESSIVE GENERATIVE NEURAL NETWORKS

CROSS-REFERENCE TO RELATED APPLICATIONS

This application claims priority to U.S. Provisional Application No. 63/404,528, filed on Sep. 7, 2022, and U.S. Provisional Application No. 63/441,412, filed on Jan. 26, 2023. The disclosures of the prior applications are considered part of and are incorporated by reference in the disclosure of this application.

BACKGROUND

This specification relates to generating audio using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a system implemented as computer programs on one or more computers in one or more locations that generates an audio signal using one or more generative neural networks.

Generally, the output audio signal is an output audio example that includes a sample of an audio wave at each of a sequence of output time steps that span a specified time window. For example, the output time steps can be arranged at regular intervals within the specified time window.

The audio sample at a given output time step can be an amplitude value of the audio wave or an amplitude value that has been compressed, companded, or both. For example, the audio sample can be a raw amplitude value or a mu-law companded representation of the amplitude value.

According to a first aspect there is provided a method for generating a prediction of an audio signal, the method comprising: receiving a request to generate an audio signal having a respective audio sample at each of a plurality of output time steps spanning a time window conditioned on an input; processing the input using an embedding neural network to map the input to one or more embedding tokens; generating a semantic representation of the audio signal that specifies a respective semantic token at each of a plurality of first time steps spanning the time window, each semantic token being selected from a vocabulary of semantic tokens conditioned on the embedding tokens and representing semantic content of the audio signal at the corresponding first time step; generating, using one or more generative neural networks and conditioned on at least the semantic representation and the embedding tokens, an acoustic representation of the audio signal, the acoustic representation specifying a set of one or more respective acoustic tokens at each of a plurality of second time steps spanning the time window, the one or more respective acoustic tokens at each second time step representing acoustic properties of the audio signal at the corresponding second time step; and processing at least the acoustic representation using a decoder neural network to generate the prediction of the audio signal.

In some implementations, processing the input using an embedding neural network to map the input to one or more embedding tokens comprises: generating an embedding vector for the input in a joint embedding space using the embedding neural network; and quantizing the embedding vector to generate embedding tokens.

In some implementations, the input comprises a sequence of text, and wherein the embedding neural network has been trained to map text and audio to a joint embedding space.

In some implementations, the input comprises a sequence of text, and the prediction of the audio signal is a prediction of music that is described by the sequence of text.

In some implementations, the input further comprises an audio signal representing a melody, and the prediction of the audio signal is a prediction of music that is described by the sequence of text and follows the melody.

In some implementations, the method further comprises: processing the audio signal using a melody embedding neural network to map the audio signal to one or more melody embedding tokens; and concatenating the melody embedding tokens with the embedding tokens.

In some implementations, the input comprises an audio signal representing a melody, and the prediction of the audio signal is a prediction of music that follows the melody.

In some implementations, the method further comprises: processing the audio signal using a melody embedding neural network to map the audio signal to one or more melody embedding tokens; and wherein each semantic token is selected from a vocabulary of semantic tokens conditioned on the melody embedding tokens.

In some implementations, processing the audio signal using a melody embedding neural network to map the audio signal to one or more melody embedding tokens comprises: generating one or more melody embedding vectors for the audio signal in a joint embedding space using the melody embedding neural network; and quantizing the one or more melody embedding vectors to generate melody embedding tokens.

In some implementations, the sequence of text comprises a plurality of subsequences of text, and the prediction of the audio signal is a prediction of music with sections of music that correspond to each of the subsequences and reflect each of the subsequences.

In some implementations, the embedding neural network is trained on training data comprising audio signals.

In some implementations, the embedding neural network has been trained on an objective so that text that describes audio signals, and the corresponding audio signals, have embeddings that are close to each other in the joint embedding space.

In some implementations, the decoder neural network is a decoder neural network of a neural audio codec that has been trained jointly with an encoder neural network on an objective that measures reconstruction quality of predicted audio signals generated by the decoder neural network from acoustic representations generated using outputs generated by the encoder neural network.

In some implementations, the acoustic representation is a prediction of a ground truth acoustic representation that would be generated from outputs of an encoder neural network by processing the audio signal.

In some implementations, the encoder neural network outputs a respective embedding at each of the plurality of second time steps, and wherein the ground truth acoustic representation is generated by applying quantization to each of the respective embeddings.

In some implementations, the quantization is residual vector quantization that encodes each embedding using a hierarchy of a plurality of vector quantizers that each generate a respective acoustic token from a corresponding vocabulary of acoustic tokens for the vector quantizer, wherein the hierarchy comprises one or more coarse vector quantizers at one or more first positions in the hierarchy and one or more fine vector quantizers at one or more last positions in the hierarchy, and the set of one or more respective acoustic tokens at each second time step comprise, for each vector quantizer, a respective acoustic token selected from the vocabulary for the vector quantizer and being a prediction of a ground truth acoustic token that would be generated by the vector quantizer from a ground truth embedding generated by the encoder neural network at the second time step.

In some implementations, the set of one or more respective acoustic tokens at each of the plurality of second time steps comprises a plurality of acoustic tokens that collectively represent a prediction of an output of a residual vector quantization applied to an embedding that represents acoustic properties of the audio signal at the second time step, the residual vector quantization encodes the embedding using a hierarchy of a plurality of vector quantizers that each generate a respective acoustic token from a corresponding vocabulary of acoustic tokens for the vector quantizer, wherein the hierarchy comprises one or more coarse vector quantizers at one or more first positions in the hierarchy and one or more fine vector quantizers at one or more last positions in the hierarchy, and the set of acoustic tokens at each second time step comprises, for each vector quantizer, a respective acoustic token selected from the vocabulary for the vector quantizer.

In some implementations, generating, using one or more generative neural networks and conditioned on at least the semantic representation and the embedding tokens, an acoustic representation of the audio signal comprises: generating, using a first generative neural network and for each of the one or more coarse vector quantizers in the hierarchy, the respective acoustic tokens for the second time steps for the vector quantizer conditioned on at least the semantic representation and the embedding tokens.

In some implementations, the first generative neural network is an auto-regressive neural network that is configured to generate the acoustic tokens auto-regressively according to a first generation order, and wherein each particular acoustic token for each particular coarse vector quantizer and at each particular second time step is conditioned on at least the semantic representation and the embedding tokens and any acoustic tokens that precede the particular acoustic token in the first generation order.

In some implementations, each particular acoustic token for each particular coarse vector quantizer and at each particular second time step is preceded in the generation order by (i) any acoustic token for any of the coarse vector quantizers at any second time step that precedes the particular second time step and (ii) any acoustic tokens at the particular second time step for any coarse vector quantizers that precede the particular vector quantizer in the hierarchy.

In some implementations, the first generative neural network has a decoder-only Transformer architecture or an encoder-decoder Transformer architecture.

In some implementations, generating, using one or more generative neural networks and conditioned on at least the semantic representation and the embedding tokens, an acoustic representation of the audio signal comprises: generating, using a second generative neural network and for each of the one or more fine vector quantizers in the hierarchy, the respective acoustic tokens for the second time steps for the vector quantizer conditioned on the respective acoustic tokens for the second time steps for the one or more coarse vector quantizers in the hierarchy.

In some implementations, the second generative neural network is not conditioned on the semantic representation and the embedding tokens.

In some implementations, the second generative neural network is an auto-regressive neural network that is configured to generate the acoustic tokens auto-regressively according to a second generation order, and wherein each particular acoustic token for each particular fine vector quantizer and at each particular second time step is conditioned on (i) the respective acoustic tokens for at least a subset of the second time steps for the one or more coarse vector quantizers (ii) at least a subset of the acoustic tokens that precede the particular acoustic token in the second generation order.

In some implementations, each particular acoustic token for each particular fine vector quantizer and at each particular second time step is preceded in the generation order by (i) any acoustic token for any of the fine vector quantizers at any second time step that precedes the particular second time step and (ii) any acoustic tokens at the particular second time step for any fine vector quantizers that precede the particular vector quantizer in the hierarchy.

In some implementations, each particular acoustic token for each particular fine vector quantizer and at each particular second time step is conditioned on (i) the respective acoustic tokens for the one or more coarse vector quantizers that are at most a threshold number of second time steps before the second time step and (ii) any acoustic tokens that precede the particular second time step in the second generation order and that are at second time steps that are at most a threshold number of second time steps before the second time step.

In some implementations, the second generative neural network has a decoder-only Transformer architecture or an encoder-decoder Transformer architecture.

In some implementations, generating a semantic representation of the audio signal comprises: generating the semantic representation auto-regressively using a third generative neural network with embedding tokens as a conditioning signal.

In some implementations, a number of first time steps and a number of second time steps that span the time window is less than the number of output time steps that span the time window.

In some implementations, the number of first time steps that span the time window is less than the number of second time steps that span the time window.

In some implementations, the input comprises a sequence of text, embeddings are embeddings in a joint embedding space, wherein the one or more generative neural networks have been trained at least in part on audio-only training data, wherein during the training, the semantic representations and the acoustic representations are conditioned on embeddings of audio inputs in the joint embedding space.

According to a further aspect, there is also described a system comprising: one or more computers; and one or more storage devices storing instructions that, when executed by the one or more computers, cause the one or more computers to perform the methods described herein.

According to a further aspect, there is also described one or more computer-readable storage media storing instructions that when executed by one or more computers cause the one or more computers to perform the methods described herein.

Particular embodiments of the subject matter described in this specification can be implemented so as to realize one or more of the following advantages.

The system described in this specification provides for high-quality audio generation with long-term coherent structure. For example, to generate a prediction of an audio signal, the system can obtain a semantic representation for the audio signal. The semantic representation can ensure long-term consistency by representing features such as linguistic content for speech, or melody and rhythm for music. The system can generate an acoustic representation of the audio signal based on the semantic representation using one or more generative neural networks. The acoustic representation can ensure high-quality audio synthesis by representing features such as acoustic details. The system can then process the acoustic representation using a decoder neural network to generate the prediction of the audio signal. Thus the system can use information from both the semantic representation and the acoustic representation to generate audio of high-quality and coherent structure.

Conventional systems that generate audio may not generate audio with coherent speech without conditioning or textual annotations. The system described in this specification can generate syntactically and semantically coherent speech without any textual annotations. For example, the system can use semantic representations to capture local dependencies such as phonetics and long-term semantic information such as linguistic content and temporal structure.

Furthermore, conventional systems that generate speech may generate speech that is limited in acoustic diversity or quality. For example, conventional systems may be trained only on clean speech, and generate speech in the voice of a single speaker. Other conventional systems may generate audio of low quality. The system described in this specification can generate speech continuations that preserve the voice, intonation, and prosody of any unseen speaker. For example, the system can use the acoustic representations to capture speaker identity and recording conditions of an audio input of a given context.

In some implementations, the audio generated by the system is music. For example, the system can generate a continuation of an audio input that includes music that is coherent with the input in terms of melody, harmony, tone, style of play, timbre, and rhythm. The system can use the semantic representation to capture information such as harmony, rhythm, and melody. For example, the semantic representation can provide for consistent melody and temporal structure with the prompt. The system can then use the semantic representation to guide the generation of the acoustic representation.

The system can save computational resources during training. For example, the decoder neural network that generates the prediction of the audio signal from the acoustic representation can be pre-trained and frozen ahead of training the one or more generative neural networks. The audio representation neural network that can be used to obtain target semantic representations and the neural audio codec that can be used to obtain target acoustic representations can also be pre-trained and frozen ahead of training the one or more generative neural networks. Furthermore, while conventional systems are trained on clean audio speech samples, the system described in this specification shows strong performance when trained on more diverse and noisy samples. The increased robustness to the quality of training data reduces the computational resources and time needed to prepare and clean the training data.

The system can also save computational resources during inference. For example, the system obtains a semantic representation, and then uses the semantic representation as conditioning for generating the acoustic representation. The number of tokens that the system processes is thus reduced compared to alternatives such as processing an interleaved sequence of semantic and acoustic tokens, allowing for more efficient inference and training. In addition, autoregressively generating semantic and acoustic tokens, and then mapping the acoustic tokens to an audio sample saves computational resources compared to alternatives such as processing audio samples directly.

In some implementations, the system can generate music given an input that includes text. The system can generate long, high-quality, and coherent music that adheres to given high-level text descriptions of greater complexity than conventional music generation systems. For example, because the system uses an embedding neural network with a joint embedding space of audio and text, and generative neural networks as described in this specification, the system can generate music conditioned on text more effectively than conventional systems that generate music from text.

Additionally, not all desired properties of music are easy to describe using text. For example, the melody can be an important property of a piece of music, but is difficult to describe using text. Given an input audio clip that represents a melody, in some implementations, the system can generate music that follows the melody. For example, the input audio clip can include a hummed melody. The system can generate music that follows a melody by providing conditioning to one or more generative neural networks using a melody embedding neural network. In some implementations, the system can generate music that follows the input melody and reflects an input sequence of text. For example, the system can generate embedding tokens, also referred to as audio embedding tokens, using an embedding neural network and a melody embedding neural network.

The system can generate music conditioned on text without requiring a large training dataset of paired text-music training data. The system can be trained on a music-only dataset. Training the system on music only also helps make the system robust to noisy labels, which can be a limitation when implementing conventional music generation systems.

In some implementations where the system can generate music given an input that includes text, each component of the system can be trained independently, allowing for flexibility and efficiency during training. For example, the embedding neural network and the decoder neural network can be trained independently or at the same time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
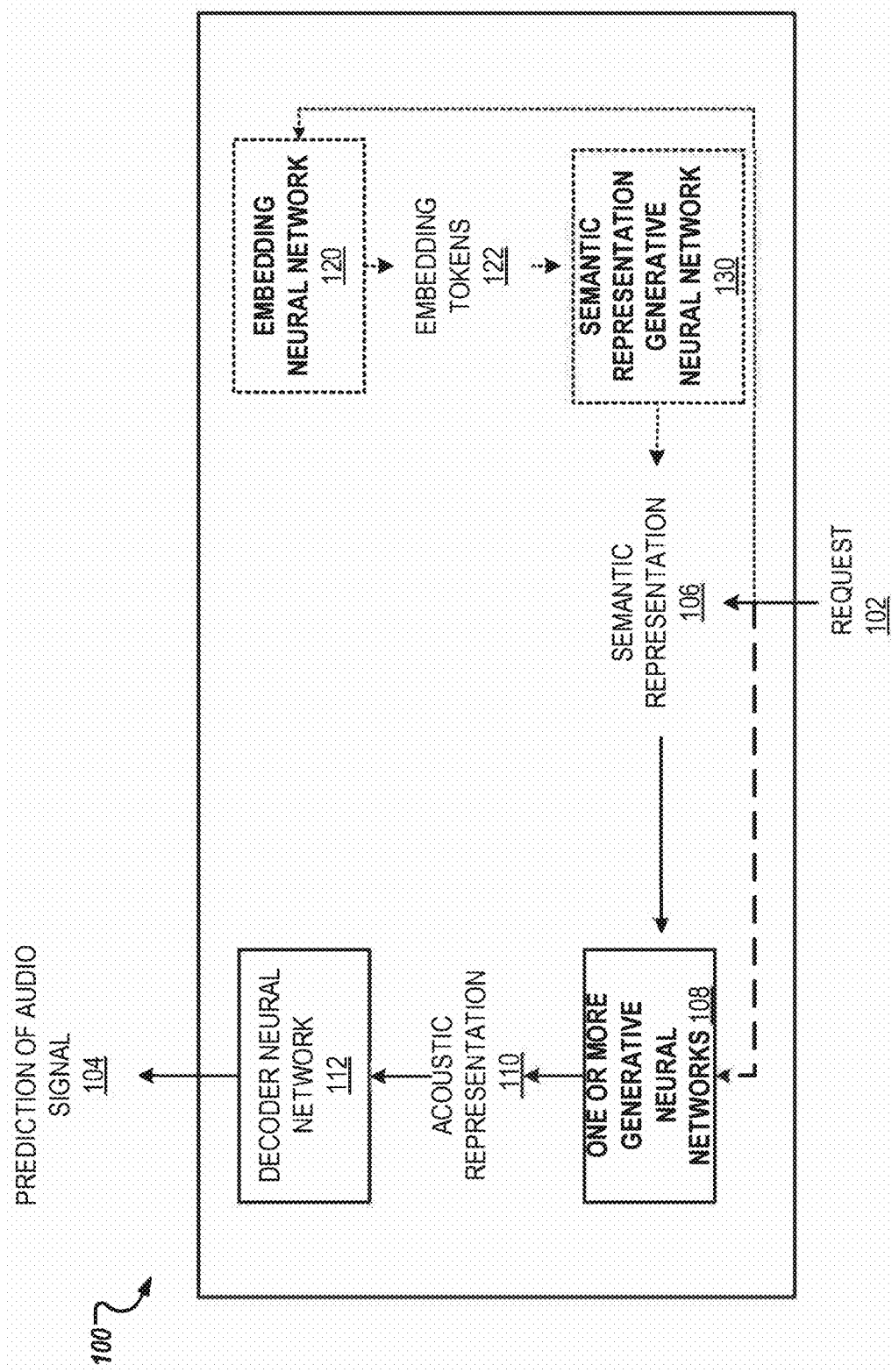
FIG. 1 is a block diagram of an example audio generation system.

FIG. 1 is a block diagram of an example audio generation system 100. The audio generation system 100 is an example of a system implemented as computer programs on one or more computers in one or more locations in which the systems, components, and techniques described below are implemented.

The audio generation system 100 generates a prediction of an audio signal 104 given a request 102 to generate an audio signal. The audio signal 104 includes a respective audio sample at each of multiple output time steps spanning a time window.

To generate audio, the system 100 receives the request 102.

In some implementations, the request 102 can specify a context for the audio signal 104. In these implementations, the audio signal 104 is conditioned on the context.

For example, the context can include an audio input as an input audio signal. In some examples, the audio input can include words spoken by a particular speaker. In these examples, the audio signal 104 can be a continuation of the words spoken by the particular speaker. In some examples, the audio input can include music. In these examples, the audio signal 104 can be a continuation of the music in the audio input.

In some implementations, the input audio signal can include a melody, and the audio signal 104 can be music that follows the melody. The system 100 can generate an output audio signal 104 that is music that follows the melody as described in further detail below with reference to FIGS. 5-8.

In some examples, the context can also include text data. The audio signal 104 can include speech that reflects the text data. In some implementations, the audio signal 104 can include music that reflects the text data. In these implementations, the system 100 generates an output audio signal 104 that reflects the text data as described in further detail below with reference to FIGS. 5-8.

In some examples, the context can also include visual data. In these examples, the audio signal 104 can include speech that describes the visual data or music that reflects the visual data.

In some implementations, the system 100 can also include an embedding neural network 120. In some examples where the context includes an input, the system 100 can process the input to map the input to one or more embedding tokens 122, also referred to as audio embedding tokens.

For example, if the input includes a sequence of text, the embedding neural network 120 can be trained to map text and audio to a joint embedding space of text and audio, also referred to as a joint audio embedding space. For example, the embedding neural network can include a neural network that maps text inputs to embeddings, and a neural network that maps audio inputs to embeddings. In the joint embedding space of text and audio, both text and audio are mapped to embeddings in the same embedding space. That is, the embedding vectors for text and audio have the same dimensionality. Furthermore, embeddings that are close together in the joint embedding space signify that the embeddings share semantics within and across modalities. For example, two embeddings that are close to each other can represent two text sequences that are semantically similar, two audio samples that are semantically similar, or an audio sample and a text sequence with semantically similar features. The embedding neural network 120 is described in further detail below with reference to FIG. 8.

The system 100 can obtain a semantic representation 106 of the audio signal 104. The semantic representation 106 specifies a respective semantic token at each of multiple first time steps spanning the time window.

Each semantic token is selected from a vocabulary of semantic tokens and represents semantic content of the audio signal 104 at the corresponding first time step. Examples of semantic content that can be represented by the semantic tokens include linguistic content, phonetics, language syntax, and prosodic features for speech. Examples of semantic content can also include genre, melody, harmony, and rhythmic properties for music.

The system can generate the semantic representation 106 of the audio signal 104 in any of a variety of ways. Generating the semantic representation 106 is described in further detail below with reference to FIGS. 3 and 7.

The number of first time steps and the number of semantic tokens can depend on the sampling rate, i.e., number of embeddings per unit of time, of the audio representation neural network described in further detail below with reference to FIGS. 3 and 7.

The system 100 then generates, using one or more generative neural networks 108 and conditioned on at least the semantic representation 106, an acoustic representation 110 of the audio signal 104.

The acoustic representation 110 specifies a set of one or more respective acoustic tokens at each of multiple second time steps spanning the time window. The one or more respective acoustic tokens at each second time step represent acoustic properties of the audio signal 104 at the corresponding second time step. Acoustic properties capture the details of an audio waveform and allow for high-quality synthesis. Acoustic properties can include, for example, speaker identity. Acoustic properties can also include recording conditions such as level of reverberation, distortion, and background noise. Generating the acoustic representation 110 is described in further detail below with reference to FIGS. 2 and 6.

The number of second time steps can depend on the sampling rate of the encoder neural network that is described in further detail below with reference to FIGS. 3 and 4. In some implementations, the number of second time steps can be greater than the number of first time steps. For example, the number of second time steps can be twice the number of first time steps. Thus for each semantic token at a first time step, the acoustic representation can include one or more acoustic tokens at each of the two second time steps that correspond to the first time step.

The system 100 then processes at least the acoustic representation 110 using a decoder neural network 112 to generate the prediction of the audio signal 104. For example, the respective audio sample at each of multiple output time steps spanning the time window can be based on one or more acoustic tokens of the acoustic representation 110.

In some implementations, the decoder neural network 112 can be a decoder neural network of a neural audio codec. The neural audio codec can be a SoundStream neural audio codec, for example. The decoder neural network 112 is described in further detail below with reference to FIGS. 3 and 4.

The system 100 can thus generate an audio signal 104 that satisfies the request from acoustic tokens, which requires less computing resources and power than generating audio samples directly without tokens. For example, autoregressively generating tokens that represent features of audio samples is more computationally efficient than autoregressively generating audio samples. The system 100 can generate tokens from embeddings at a lower sampling rate than the sampling rate of the audio signal. For example, the audio signal can have a sampling rate of 16 kHz, so that the audio signal includes an audio sample for every 0.0625 ms. The embeddings for generating semantic tokens can be computed at a sampling rate of 25 Hz, so that each embedding can represent features for a 40 ms window of the audio signal. In addition, the embeddings for generating acoustic tokens can be computed at a sampling rate of 50 Hz, so that each embedding can represent features for a 20 ms window of the audio signal. After quantizing the embeddings into acoustic tokens, the system 100 can leverage the decoder neural network 112 to decode the acoustic tokens to an audio signal at the higher sampling rate.

The system 100 can be configured to perform any of a variety of tasks that require generating an audio signal 104 as output.

For example, the audio signal 104 can be a speech signal and the system 100 can generate the speech signal unconditionally, e.g., resulting in a speech signal being generated that is drawn from a distribution represented by the training data set(s) on which the generative neural network(s) were trained.

As another example, the audio signal 104 can be a different type of audio signal, e.g., music, animal sounds and so on, and the system can generate the audio signal 104 unconditionally, e.g., resulting in an audio signal 104 being generated that is drawn from a distribution represented by the training data set(s) on which the generative neural network(s) were trained.

As another example, as described above, the system 100 can receive a context along with the request to generate the audio signal 104 and generate the audio signal 104 conditioned on the received context.

For example, the audio signal 104 can be a speech or other audio signal, i.e., so that the system 100 generates the output audio signal 104 conditioned on a context that is an input audio signal.

As one example, the output audio signal 104 that is generated can be a prediction of an audio signal that follows the input audio signal. For example, the context can be an input speech signal that is a question that is asked by one speaker and the output audio signal can be an output speech signal that is an answer to the question spoken by the same speaker or another speaker. As another example, the context can be an input speech signal that is a first portion of an utterance spoken by one speaker and the output audio signal 104 can be an output speech signal that is a completion of the utterance spoken by the speaker or by another speaker or a response to the input utterance.

As an example, in some implementations, the input audio signal can represent music, and the system 100 can generate an output audio signal 104 that is music that follows the input audio signal.

As another example, the system 100 can perform sound separation on the input audio signal to generate the output audio signal 104. For example, the input audio signal can include both speech and music or other background noise and the output audio signal 104 can represent only the speech. As another example, the input audio signal can include speech from multiple speakers (and optionally background noise) and the output audio signal 104 can include only the speech of one of the speakers. In some examples, the system 100 can perform audio-conditional separation, i.e., when the input audio signal can include an extra audio input acoustically similar to one of the speakers, and the output audio signal 104 can include only the speech of the speaker in the input audio signal that is acoustically similar to the extra audio input.

As another example, the system 100 can perform speech-to-speech translation, where the input speech and the output speech represent the same semantic content but spoken differently. For example, the input audio signal can include speech in one natural language and the output audio signal can represent speech in a target, different natural language that is a translation of the input speech into the target language. As another example, the input audio signal can include speech spoken by a first speaker and the output audio signal 104 can represent the same semantic content as the input speech but spoken by a different speaker. As one example of this, the input audio signal can include speech spoken by a first speaker with a first accent of a natural language and the output audio signal can represent the same semantic content as the input speech but spoken by a different speaker with a different accent of the natural language. As another example of this, the input audio signal can include speech spoken by a first speaker that has a speech impediment and the output audio signal can represent the same semantic content as the input speech but without the speech impediment. As another example, the input audio signal can include a first speech segment and the output audio signal can include a second, shorter speech segment that summarizes the semantic content of the first speech.

As another example, in some implementations, the system 100 can perform melody-conditional music generation, where the input audio signal represents a melody, and the system 100 can generate an output audio signal 104 that is music that follows the melody.

As another example, the context can include both audio data and text data.

For example, the system 100 can perform transcript conditioned speech enhancement, where the context is a text transcript and noisy audio corresponding to the text transcript and the output audio signal 104 is clean audio corresponding to the text transcript. For example, the clean audio can include less background noise than the noisy audio.

As another example, the system 100 can perform transcript-based audio in-filling, where the context is a text transcript and audio corresponding to a portion of the text transcript, and the output audio signal 104 corresponds to a different portion of the text transcript. The system 100 can be trained to predict semantic tokens and acoustic tokens autoregressively with teacher-forcing, for example.

As another example, the system 100 can perform speaker-conditioned text-to-speech, where the context is a text transcript and audio of a speaker and the output audio signal 104 is a verbalization of the text transcript being spoken by the speaker.

As another example, in some implementations, the system 100 can perform text and melody-conditional music generation. The context can include a sequence of text and an input audio signal representing a melody. The system 100 can generate an output audio signal 104 that is music that is described by the sequence of text and follows the melody.

As another example, the context can include both audio data and visual, e.g., image or video, data.

For example, the system 100 can perform audio-video continuation, where the system receives a partial audio track with corresponding video, and the output audio signal 104 is a continuation of the partial audio track.

As another example, the system 100 can perform cross-modal in-filling, where the system receives video and an audio track corresponding to a portion of the video and the output audio signal 104 is an audio track corresponding to a different portion of the video.

As another example, the context input can include only visual data.

For example, the system 100 can perform image-conditioned audio generation, where the system receives an input image and generates an output audio signal 104 that describes the image.

As another example, the context input can include only text data.

For example, the system 100 can perform sound synthesis based on text descriptions, e.g., where the input is text that describes an audio signal and the output is an audio signal 104 that is characterized by the text.

As an example, the system 100 can perform text-conditional music generation, where the input can include a sequence of text and the system 100 can generate an output audio signal 104 that is music that can be described by the sequence of text. Generating music given text that describes the music is described in more detail below with reference to FIGS. 5-8.

As another example, in some implementations, the system 100 can perform story mode generation. The input can include multiple subsequences of text. The system can generate an output audio signal 104 that includes sections of music that correspond to each of the subsequences. Each section of music can be described by the corresponding subsequence of text. In addition, the system 100 can generate smooth transitions between each section of music that are consistent in tempo and semantically plausible.

As another example, the system 100 can perform text-conditioned speech sampling, e.g., where the input is a text transcript and the output audio signal 104 is a verbalization of the text transcript being spoken by a random speaker in a random prosody.

In some implementations where the context input includes non-audio data, the system 100 can be trained on training data that includes only audio, as described below in more detail with reference to FIG. 8.

Figure 2:
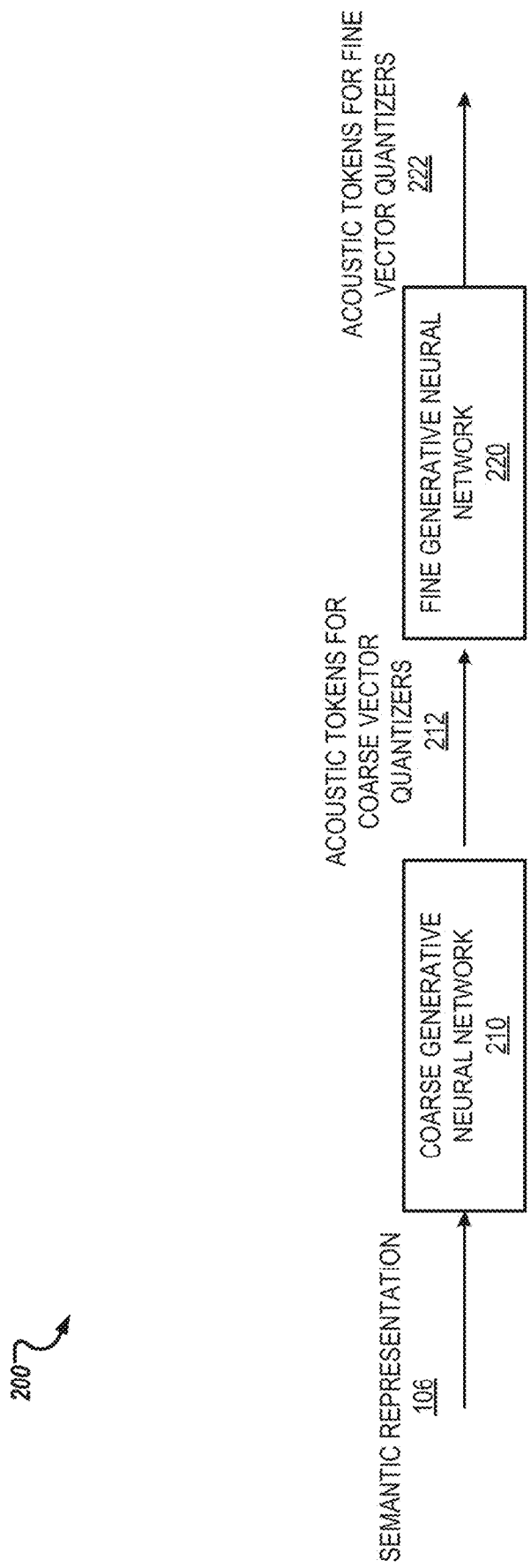
FIG. 2 is a diagram of an example process for generating acoustic tokens.

FIG. 2 is a diagram of an example process for generating acoustic tokens. For convenience, the process 200 will be described as being performed by a system of one or more computers located in one or more locations. For example, an audio generation system, e.g., the audio generation system 100 of FIG. 1, appropriately programmed in accordance with this specification, can perform the process 200.

The system can generate acoustic tokens for the acoustic representation using one or more generative neural networks such as a coarse generative neural network 210 and a fine generative neural network 220. The coarse generative neural network 210 is also referred to as the first generative neural network. The fine generative neural network 220 is also referred to as the second generative neural network. The system can condition the generation of the acoustic representation on at least the semantic representation 106.

The encoder neural network can be part of a neural audio codec that includes a decoder neural network and an encoder neural network. As described in further detail below with reference to FIG. 4, the decoder neural network and the encoder neural network can be trained jointly. The coarse generative neural network 210 and the fine generative neural network 220 can be trained to predict acoustic representations generated based on outputs of the vector quantizers of the neural audio codec.

In some implementations, the set of one or more respective acoustic tokens at each of the multiple second time steps includes multiple acoustic tokens that collectively represent a prediction of an output of a residual vector quantization applied to an embedding that represents acoustic properties of the audio signal at the second time step. The residual vector quantization encodes the embedding using a hierarchy of multiple vector quantizers that each generate a respective acoustic token from a corresponding vocabulary of acoustic tokens for the vector quantizer. The hierarchy includes one or more coarse vector quantizers at one or more first positions in the hierarchy and one or more fine vector quantizers at one or more last positions in the hierarchy. The set of acoustic tokens at each second time step includes, for each vector quantizer, a respective acoustic token selected from the vocabulary for the vector quantizer.

For example, the hierarchy can include Q vector quantizers, and the vector quantizers 1 ... Q' can be coarse vector quantizers, and the vector quantizers (Q'+1) ... Q can be fine vector quantizers. The coarse vector quantizers generate coarse acoustic tokens, or acoustic tokens for coarse vector quantizers 212, that represent acoustic properties such as speaker identity and recording conditions. The fine vector quantizers generate fine acoustic tokens, or acoustic tokens for fine vector quantizers 222, that represent fine acoustic details. For example, fine acoustic tokens can be used to remove lossy compression artifacts in the coarse acoustic tokens.

In some implementations, the number of first time steps and the number of second time steps that span the time window is less than the number of output time steps that span the time window. That is, the sampling rate of the encoder neural network that outputs respective embeddings at each of the second time steps can be lower than the sampling rate of the audio signal. In addition, the sampling rate of the audio representation neural network described below with reference to FIG. 3 can be lower than the sampling rate of the audio signal. Thus the number of embeddings from which semantic tokens can be generated, and the number of embeddings from which acoustic tokens can be generated, can be less than the number of output time steps.

In some implementations, the number of first time steps that span the time window is less than the number of second time steps that span the time window. For example, for every semantic token, the system can generate two acoustic tokens for each coarse vector quantizer, and generate two acoustic tokens for each fine vector quantizer. That is, the sampling rate of the encoder neural network that outputs respective embeddings at each of the second time steps can be higher than that of the audio representation neural network described below with reference to FIG. 3.

To generate the acoustic representation, the coarse generative neural network 210 can generate acoustic tokens for coarse vector quantizers 212 conditioned on at least the semantic representation 106. For example, the coarse generative neural network 210 can generate, for each of the one or more coarse vector quantizers in the hierarchy, the respective acoustic tokens for the second time steps for the vector quantizer conditioned on at least the semantic representation. The acoustic tokens for coarse vector quantizers 212 represent acoustic properties such as speaker identity and recording conditions.

In some implementations where the request specifies a context and the context specifies acoustic properties of the audio signal, such as where the context includes an audio input, the system can generate the acoustic representation of the audio signal conditioned on the semantic representation and the context. For example, the coarse generative neural network 210 can generate, for each of the one or more coarse vector quantizers in the hierarchy, the respective acoustic tokens for the second time steps for the vector quantizer conditioned on the semantic representation 106 and acoustic tokens representing the context.

The coarse generative neural network 210 can be an auto-regressive neural network that is configured to generate the acoustic tokens for coarse vector quantizers 212 auto-regressively according to a first generation order.

Each particular acoustic token for each particular coarse vector quantizer and at each particular second time step is conditioned on at least the semantic representation and any acoustic tokens that precede the particular acoustic token in the first generation order. Furthermore, each particular acoustic token for each particular coarse vector quantizer and at each particular second time step is preceded in the generation order by (i) any acoustic token for any of the coarse vector quantizers at any second time step that precedes the particular second time step and (ii) any acoustic tokens at the particular second time step for any coarse vector quantizers that precede the particular vector quantizer in the hierarchy.

For example, the hierarchy can include Q vector quantizers, and the vector quantizers $1 \ldots Q'$ can be coarse vector quantizers, while the vector quantizers $(Q'+1) \ldots Q$ can be fine vector quantizers. The acoustic token at a particular second time step t and a particular coarse vector quantizer $q \leq Q'$ is conditioned on all of the semantic tokens of the semantic representation, any acoustic tokens at second time steps preceding the second time step t and coarse vector quantizers preceding $Q'$, and any acoustic tokens at the second time step t at coarse vector quantizers preceding the particular coarse vector quantizer q.

In some implementations, the coarse generative neural network 210 has a decoder-only Transformer architecture. In some implementations, the coarse generative neural network 210 has an encoder-decoder Transformer architecture.

To generate the acoustic representation, the fine generative neural network 220 can generate acoustic tokens for fine vector quantizers 222 conditioned on at least the acoustic tokens for coarse vector quantizers 212. For example, the fine generative neural network 220 can generate, for each of the one or more fine vector quantizers in the hierarchy, the respective acoustic tokens for the second time steps for the vector quantizer conditioned on the respective acoustic tokens for the second time steps for the one or more coarse vector quantizers in the hierarchy. The fine generative neural network 220 can thus not be conditioned on the semantic representation 106. The acoustic tokens for fine vector quantizers 222 can be used to further improve audio quality, for example, by removing lossy compression artifacts.

The fine generative neural network 220 can be an auto-regressive neural network that is configured to generate the acoustic tokens auto-regressively according to a second generation order. Each particular acoustic token for each particular fine vector quantizer and at each particular second time step is conditioned on (i) the respective acoustic tokens for at least a subset of the second time steps for the one or more coarse vector quantizers and (ii) at least a subset of the acoustic tokens that precede the particular acoustic token in the second generation order. Each particular acoustic token for each particular fine vector quantizer and at each particular second time step is preceded in the second generation order by (i) any acoustic token for any of the fine vector quantizers at any second time step that precedes the particular second time step and (ii) any acoustic tokens at the particular second time step for any fine vector quantizers that precede the particular vector quantizer in the hierarchy.

For example, the hierarchy can include Q vector quantizers, and the vector quantizers $(Q'+1) \ldots Q$ can be fine vector quantizers. The acoustic token at a particular second time step t and a particular fine vector quantizer $q > Q'$ is conditioned on all of the acoustic tokens for the coarse vector quantizers 312, any acoustic tokens at second time steps preceding the second time step t and at fine vector quantizers following $Q'$, and any acoustic tokens at the second time step t at coarse vector quantizers and fine vector quantizers preceding the particular fine vector quantizer q.

In some implementations, each particular acoustic token for each particular fine vector quantizer and at each particular second time step is conditioned on (i) the respective acoustic tokens for the one or more coarse vector quantizers that are at most a threshold number of second time steps before the second time step and (ii) any acoustic tokens that precede the particular second time step in the second generation order and that are at second time steps that are at most a threshold number of second time steps before the second time step. That is, the second time steps can be split into non-overlapping batches of successive second time steps.

For example, the acoustic token at a particular second time step t and a particular fine vector quantizer $q > Q'$ is conditioned on acoustic tokens for the coarse vector quantizers 312 preceding the particular second time step t that are within the same corresponding batch of second time steps as the particular second time step t, and any acoustic tokens at second time steps preceding the second time step t within the corresponding batch and at fine vector quantizers following $Q'$, and any acoustic tokens at the second time step t at coarse vector quantizers and fine vector quantizers preceding the particular fine vector quantizer q.

In some implementations, the fine generative network 220 has a decoder-only Transformer architecture. In some implementations, the fine generative neural network 220 has an encoder-decoder Transformer architecture.

In some implementations, the system can generate acoustic tokens for coarse vector quantizers 212 and acoustic tokens for fine vector quantizers 222 at once. For example, for a hierarchy of Q vector quantizers, the acoustic token at a particular second time step t for a particular coarse vector quantizer or fine vector quantizer q is conditioned on all of the acoustic tokens at second time steps preceding the second time step t and at vector quantizers preceding q, and any acoustic tokens at the second time step t at vector quantizers preceding the particular vector quantizer q.

The system can include the acoustic tokens for fine vector quantizers 222 in the acoustic representation. The system can use the acoustic representation to generate the prediction of the audio signal, as described below with reference to FIG. 3.

Figure 3:
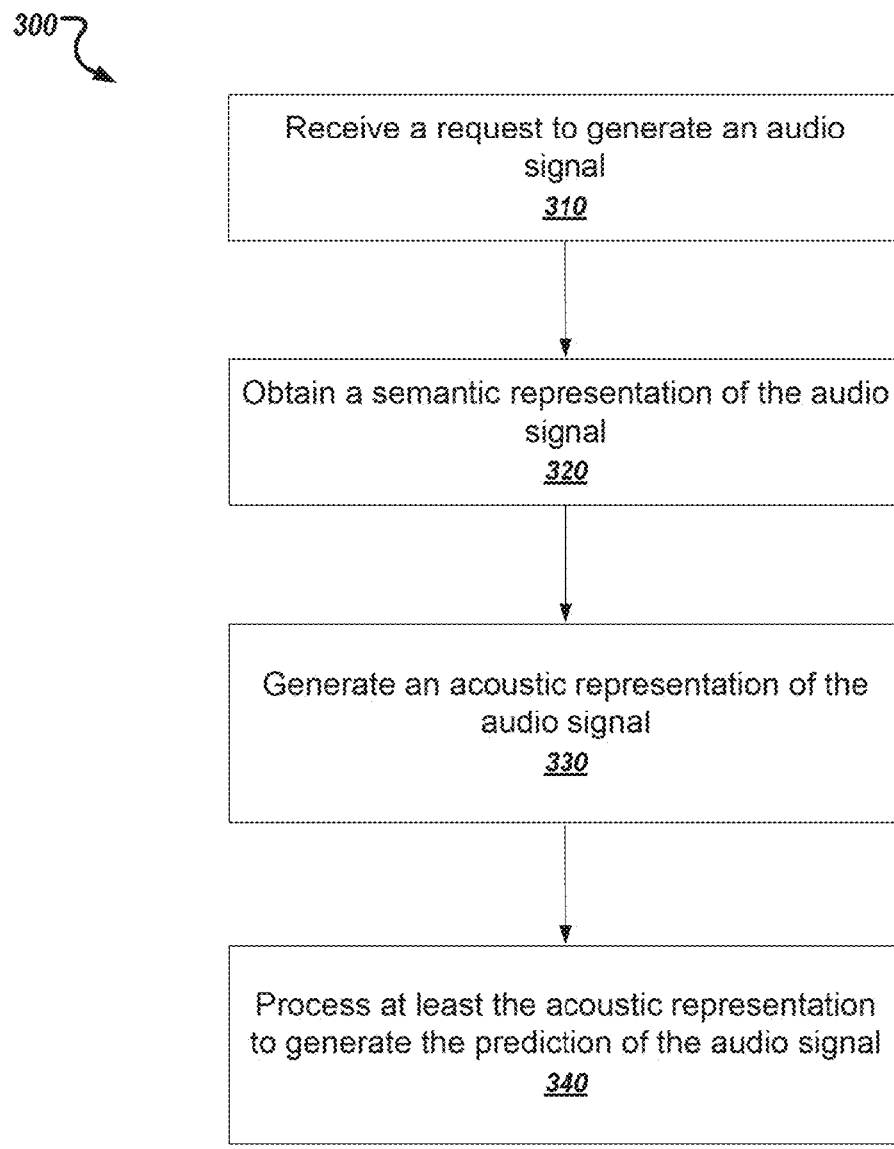
FIG. 3 is a flow diagram of an example process for generating a prediction of an audio signal.

FIG. 3 is a flow diagram of an example process for generating a prediction of an audio signal. For convenience, the process 300 will be described as being performed by a system of one or more computers located in one or more locations. For example, an audio generation system, e.g., the audio generation system 100 of FIG. 1, appropriately programmed in accordance with this specification, can perform the process 300.

The system receives a request to generate an audio signal (step 310). The audio signal has a respective audio sample at each of multiple output time steps spanning a time window. In some examples, the request can specify a context for the audio signal. The audio signal can be conditioned on the context. For example, the context can include an audio input, visual data, and/or text data as described above.

The system obtains a semantic representation of the audio signal (step 320). The semantic representation specifies a respective semantic token at each of multiple first time steps spanning the time window. Each semantic token can be selected from a vocabulary of semantic tokens and can represent semantic content of the audio signal at the corresponding first time step.

In some implementations, the system can generate the semantic representation. For example, the system can generate the semantic representation auto-regressively using a semantic representation generative neural network. The semantic representation generative neural network can also be referred to as a third generative neural network.

For example, the semantic representation generative neural network can be trained to auto-regressively generate semantic tokens one after the other. The semantic representation generative neural network can be, e.g., a decoder only or an encoder-decoder Transformer-based neural network. For example, the semantic representation generative neural network can have been trained to predict semantic representations generated based on outputs of one or more layers, e.g., of one of the intermediate layers, of an audio representation neural network.

The audio representation neural network can generate outputs or embeddings at regular intervals of time. For example, the audio representation neural network can generate one embedding for every 40 ms of the input audio signal.

The training of the semantic representation generative neural network and the audio representation neural network is described in further detail below with reference to FIG. 4.

In some implementations, the request specifies a context that specifies semantic properties of the audio signal. For example, the context can include an audio input. The system can generate the semantic representation conditioned on the context. For example, when the generation is conditioned on a context that includes an audio input, the system can generate a semantic representation of the audio input as described above using the audio representation neural network.

In some examples, the audio signal spans the same time window as the audio input. The system can use the semantic representation of the audio input as the semantic representation of the audio signal. For example, the semantic representation of the audio signal can include the semantic tokens of the semantic representation of the audio input.

In some examples, the audio signal spans a longer time window than the audio input. For example, the audio signal can be a continuation of the audio input. For example, the audio signal can be a continuation of speech or a continuation of music. The system can condition the semantic representation generative neural network on at least the semantic representation of the audio input while auto-regressively generating the semantic representation of the audio signal. For example, the semantic representation generative neural network can auto-regressively generate the semantic tokens of the audio signal conditioned on the semantic tokens for the audio input. The semantic representation of the audio signal can include the semantic tokens of the semantic representation of the audio input, followed by auto-regressively generated semantic tokens.

In some implementations, the request specifies a context that includes text or image data. When the generation is conditioned on a context input that at least in part is not audio, the system can generate the semantic tokens by, for the non-audio portion of the audio input, mapping the context input to semantic tokens from the vocabulary using an appropriate encoder neural network and using the semantic tokens as (at least part of) the semantic representation of the audio signal or can condition the semantic representation generative neural network on at least the semantic tokens while auto-regressively generating the semantic representation of the audio signal.

For example, if the context includes image data, the system can map the image data to semantic tokens from the vocabulary using an encoder neural network that is configured to map image data to audio. In some examples, the system can use the semantic tokens as the semantic representation of the audio signal. In some examples, the system can condition the semantic representation generative neural network on at least the semantic tokens while auto-regressively generating the semantic representation of the audio signal.

For example, if the context includes text data, the system can map the text data to semantic tokens from the vocabulary using an encoder neural network that is configured to map text data to audio. In some implementations, the encoder neural network can be the embedding neural network described in further detail with reference to FIGS. 1 and 8. For example, the text data can include a sequence of text that describes music, and the embedding neural network can map descriptions of music to audio. The system can use semantic tokens corresponding to the audio as at least part of the semantic representation of the audio signal. In some examples, the system can condition the semantic representation generative neural network on at least the semantic tokens while auto-regressively generating the semantic representation of the audio signal.

The system generates an acoustic representation of the audio signal (step 330). The system can generate the acoustic representation using one or more generative neural networks and conditioned on at least the semantic representation. The acoustic representation specifies a set of one or more respective acoustic tokens at each of multiple second time steps spanning the time window. The one or more respective acoustic tokens at each second time step can represent acoustic properties of the audio signal at the corresponding second time step. Generating the acoustic representation of the audio signal is described in further detail above with reference to FIG. 2.

In some implementations, the context specifies acoustic properties of the audio signal to be generated, such as when the context specifies a target speaker for the output audio signal, includes speech that is to be followed by the output audio signal, or includes audio that should be in another way similar to the output audio signal. In these implementations, the system can map the context to an acoustic representation, e.g., using a neural audio codec as described above, and use at least part of the acoustic representation of the context when generating the acoustic representation of the audio signal. Generating the acoustic representation conditioned on the context is described in further detail above with reference to FIG. 2.

The system processes at least the acoustic representation to generate the prediction of the audio signal (step 340). The system can process at least the acoustic representation using the decoder neural network to generate the prediction of the audio signal. For example, the respective audio sample at each of multiple output time steps spanning the time window can be based on one or more acoustic tokens for every vector quantizer in the hierarchy.

In some implementations where the context specifies acoustic properties of the audio signal, the system can process the acoustic representation and an acoustic representation of the context using the decoder neural network to generate the prediction of the audio signal. For example, the decoder neural network can process the acoustic tokens of the acoustic representation and acoustic tokens representing the context.

In some implementations, a number of first time steps and a number of second time steps that span the time window is less than the number of output time steps that span the time window. In some implementations, the number of first time steps that span the time window is less than the number of second time steps that span the time window, as described in further detail above with reference to FIG. 2.

Figure 4:
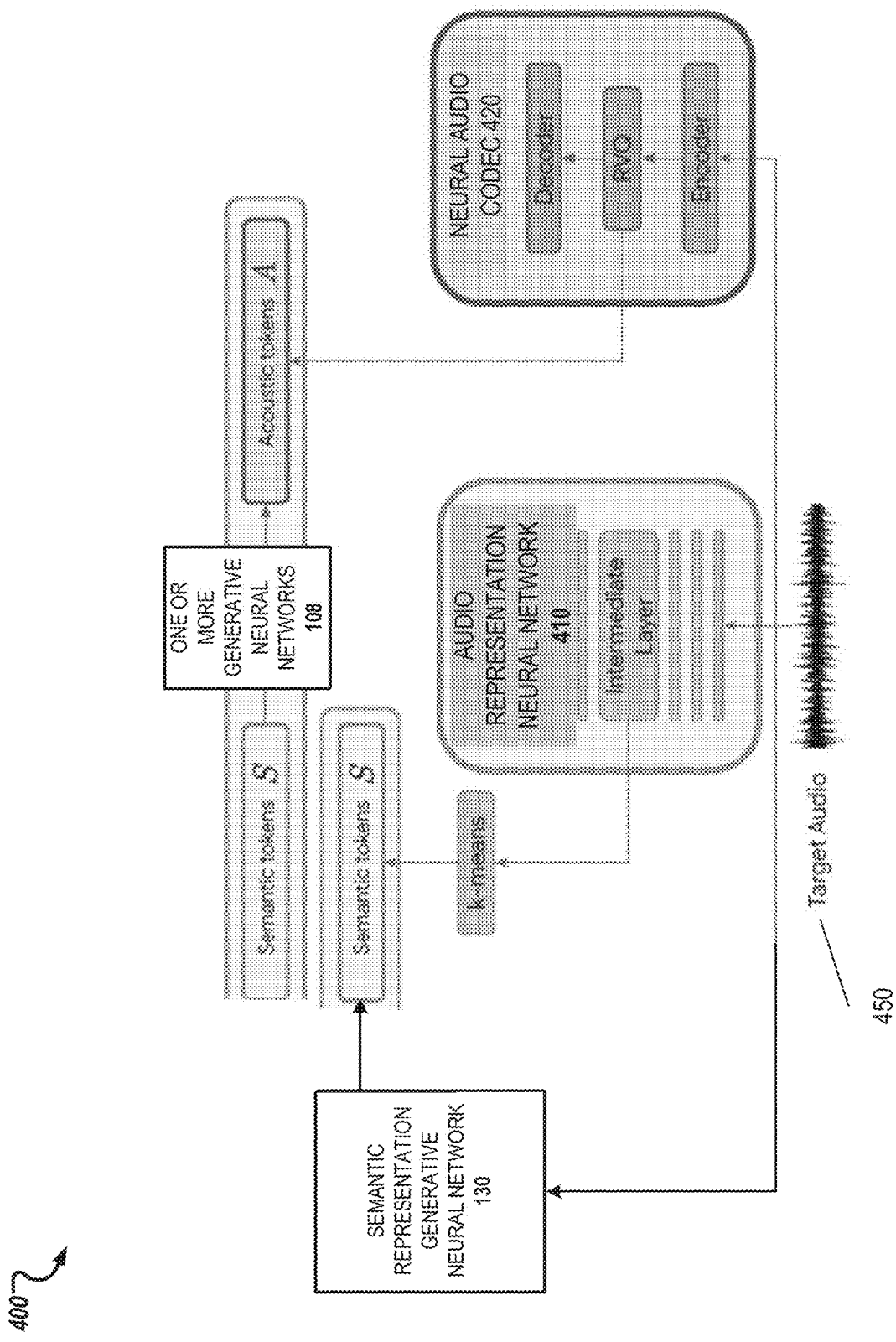
FIG. 4 is a diagram of an example process for training an example audio generation system.

FIG. 4 is a diagram of an example process 400 for training an example audio generation system. For convenience, the process 400 will be described as being performed by a training system of one or more computers located in one or more locations.

The training system can train an audio generation system such as the audio generation system 100 of FIG. 1 on training data. In some implementations, the components of the audio generation system such as the semantic representation generative neural network 130, one or more generative neural networks 108, neural audio codec 420, and audio representation neural network 410 can be trained independently.

The training system can train the neural audio codec 420 and the audio representation neural network 410 on training data that includes audio clips. An example audio clip of the training data is shown in FIG. 4 as target audio 450.

The neural audio codec 420 can include a decoder neural network and an encoder neural network. For example, the encoder neural network can convert the target audio 450 into a coded signal which is quantized into an acoustic representation. The decoder neural network can convert the acoustic representation into a predicted audio signal. In some implementations, the neural audio codec 420 can be pre-trained and frozen prior to the training of the audio generation system.

The neural audio codec 420 can be trained to minimize adversarial and reconstruction loss. For example, the decoder neural network and the encoder neural network can be trained jointly on an objective that measures reconstruction quality of predicted audio signals generated by the decoder neural network from acoustic representations generated using outputs generated by the encoder neural network.

The audio representation neural network 410 can have been trained to generate representations of input audio signals. In some implementations, the audio representation neural network 410 can be pre-trained and frozen prior to the training of the audio generation system. The audio representation neural network 410 can be trained to minimize masked language model (MLM) loss and contrastive loss. The audio representation neural network 410 can be a w2v-BERT model that maps input audio signals to a set of linguistic features, for example.

The training system can train the semantic representation generative neural network 130 and the one or more generative neural networks 108 on training data that includes audio clips. In some implementations, the generative neural networks can be trained with teacher-forcing.

The training system can train the semantic representation generative neural network 130 to predict semantic representations generated based on outputs of one or more layers, e.g., of one of the intermediate layers, of the audio representation neural network 410.

For example, the audio representation neural network 410 can include models with multiple layers. For example, the audio representation neural network 410 can include a self-attention based model, e.g., a Transformer-based model or a Conformer-based model with multiple layers.

The self-attention based model can have been trained on a speech representation task, e.g., through self-supervised learning. The self-attention based model can have been trained on other tasks such as automatic speech recognition, for example.

The outputs of the one or more layers of the audio representation neural network 410 can include embeddings of input audio. For example, the self-attention based model can generate dense embeddings for some or all of the audio samples in the training data. The embeddings for an intermediate layer of the self-attention based model for some or all of the audio samples can be clustered by k-means into K clusters. The centroids of the clusters can be used as semantic tokens. In some implementations, the outputs can be normalized so that each dimension has zero mean and unit variance before clustering.

An example target semantic representation for the training of the semantic representation generative neural network 130 can have been generated by providing the target audio 450 to the self-attention based model. The training system can generate the semantic tokens of the target semantic representation by assigning each output for the target audio 450 to the centroid of the nearest cluster.

In some implementations, consecutive repetitions of semantic tokens within the target semantic representations can be removed. For example, a target semantic representation for the target audio 450 includes a sequence of semantic tokens. The training system can remove consecutive repeating semantic tokens in the sequence, and then use the target semantic representation without consecutive repeating semantic tokens for training.

The training system can train the one or more generative neural networks 108 to generate an acoustic representation conditioned at least on a semantic representation. In some implementations, the acoustic representation can be a prediction of a ground truth acoustic representation that would be generated from outputs of an encoder neural network by processing the audio signal. For example, the encoder neural network can be a convolutional encoder that maps the audio signal to a sequence of embeddings. The encoder neural network can output a respective embedding at each of multiple second time steps. Each respective embedding at each of multiple second time steps can correspond to features of the audio signal at the second time step. The ground truth acoustic representation can be generated by applying quantization to each of the respective embeddings. As described above, the encoder neural network can be part of a neural audio codec such as the neural audio codec 420.

For example, the quantization can be residual vector quantization that encodes each embedding using a hierarchy of multiple vector quantizers that each generate a respective acoustic token from a corresponding vocabulary of acoustic tokens for the vector quantizer. The hierarchy can include Q vector quantizers that each use a corresponding vocabulary. The hierarchy can include one or more coarse vector quantizers at one or more first positions in the hierarchy, and one or more fine vector quantizers at one or more last positions in the hierarchy. The set of one or more respective acoustic tokens at each second time step can include, for each vector quantizer, a respective acoustic token selected from the vocabulary for the vector quantizer and that is a prediction of a ground truth acoustic token that would be generated by the vector quantizer from a ground truth embedding generated by the encoder neural network at the second time step.

The training system can train the one or more generative neural networks 108 to predict acoustic representations generated based on outputs of the residual vector quantizer of the neural audio codec 420.

The target acoustic representations for the training of the one or more generative neural networks 108 can have been generated by applying quantization to each of the respective embeddings outputted by the encoder neural network of the neural audio codec 420 at each of multiple second time steps. The quantization can be a residual vector quantization (RVQ) as described above with reference to FIG. 2.

Figure 5:
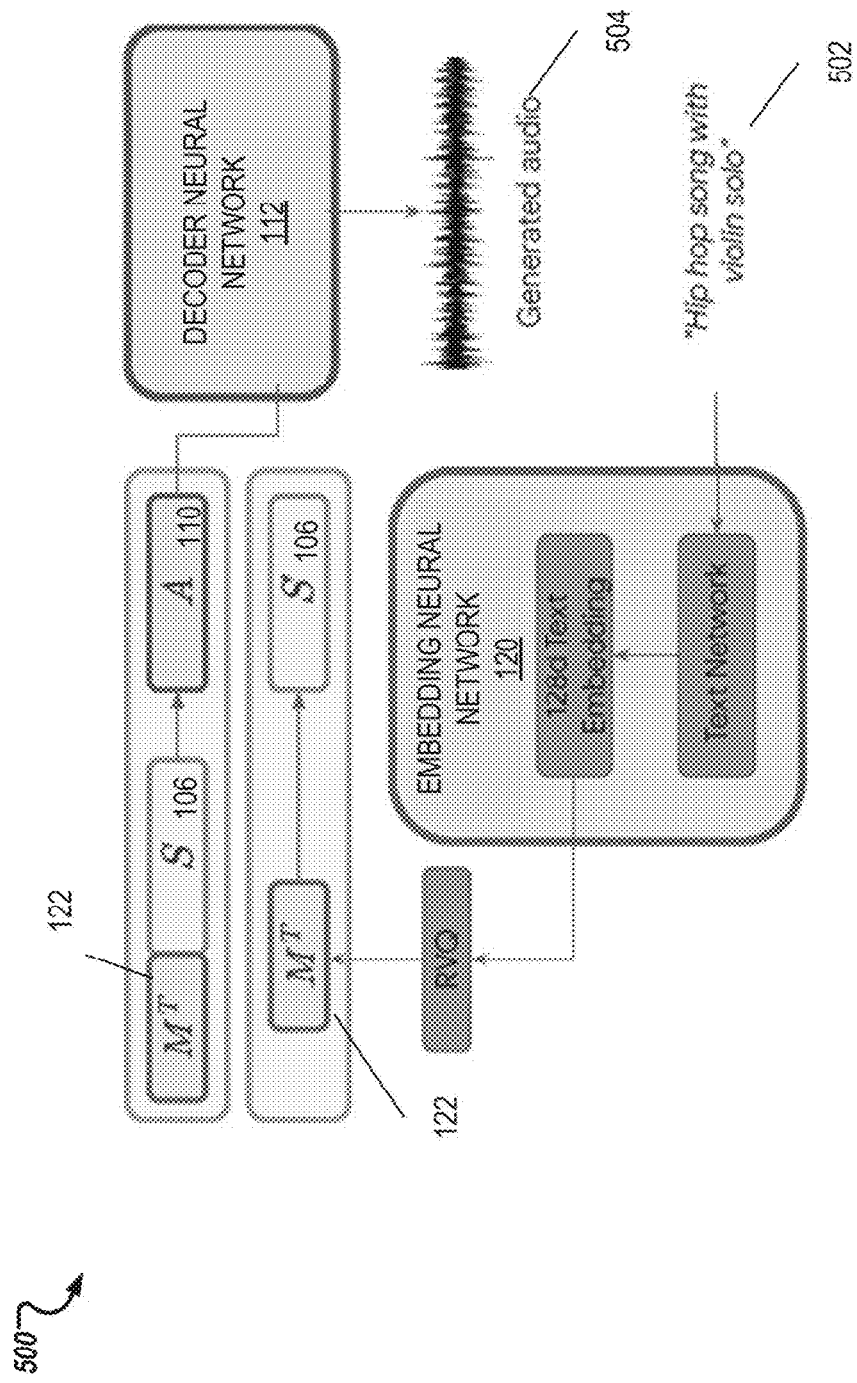
FIG. 5 is a diagram of an example process for generating a prediction of an audio signal.

FIG. 5 is a diagram of an example process for generating a prediction of an audio signal. For convenience, the process 500 will be described as being performed by a system of one or more computers located in one or more locations. For example, an audio generation system, e.g., the audio generation system 100 of FIG. 1, appropriately programmed in accordance with this specification, can perform the process 500.

The system receives a request to generate an audio signal conditioned on an input 502. For example, the input 502 can be included in the context for the audio signal described above with reference to FIGS. 1-3. In the example process 500, the input includes text data. The system can perform text-conditional music generation so that the generated audio 504 is music that is described by the text data, "hip hop song with violin solo." The text data can include descriptions of significant complexity, such as "enchanting jazz song with a memorable saxophone solo and a solo singer" or "Berlin 90s techno with a low bass and strong kick."

The system processes the text data using the embedding neural network 120 described above with reference to FIG. 1. The embedding neural network 120 maps the text to one or more embedding tokens 122. The embedding neural network 120 can be trained to map text and audio to a joint embedding space for text and audio, also referred to as a joint audio embedding space. The system can generate an embedding vector for the input of text data in a joint embedding space using the embedding neural network 120. The system can then quantize the embedding vector to generate embedding tokens 122.

In some implementations, the embedding neural network 120 can include a text network and a music network. For example, the embedding neural network 120 can include a neural network trained to map text to an embedding in the joint embedding space, and a neural network trained to map audio to an embedding in the joint embedding space. For example, the embedding neural network 120 can be a joint embedding model with two embedding towers, one for text, and one for music. The towers map text and music to a shared embedding space using contrastive learning. The training of the embedding neural network 120 is described below with reference to FIG. 8.

The system generates a semantic representation 106 of the audio signal 504. Each semantic token of the semantic representation 106 is selected from a vocabulary of semantic tokens conditioned on the embedding tokens 122.

For example, the system can generate the semantic representation 106 auto-regressively using a semantic representation generative neural network with embedding tokens 122 as a conditioning signal. For example, the semantic representation generative neural network can be conditioned on the embedding tokens 122 while auto-regressively generating the semantic representation 106. That is, the semantic token at each first time step can be conditioned on the semantic tokens for preceding first time steps and the embedding tokens 122. The semantic representation generative neural network can generate $S_t|S_{<t}, M_T$ where $S_t$ represents a semantic token at a first time step t, and $M_T$ represents the embedding tokens 122.

The system then generates an acoustic representation 110 of the audio signal 504 conditioned on at least the semantic representation 106 and the embedding tokens 122. The system can generate the acoustic representation using one or more generative neural networks and conditioned on at least the semantic representation 106 and the embedding tokens 122. For example, the one or more generative neural networks can auto-regressively generate the acoustic representation 110 conditioned on the semantic representation 106 and the embedding tokens 122. That is, the set of one or more acoustic tokens at each second time step can be conditioned on the acoustic tokens at preceding second time steps, the semantic representation 106, and the embedding tokens 122. The one or more generative neural networks can generate $A_t|A_{<t}, S, M_T$ where $A_t$ represents an acoustic token at a first time step t, S represents the semantic representation, and $M_T$ represents the embedding tokens 122 generated from text.

The system then processes at least the acoustic representation 110 using a decoder neural network 112 to generate the prediction of the audio signal 504.

The generated audio 504 thus includes music that can be described by the text data of the input 502, "hip hop song with violin solo." Although the input 502 in this example includes text data, the system can be trained on audio signals as described below with reference to FIG. 8.

Figure 6:
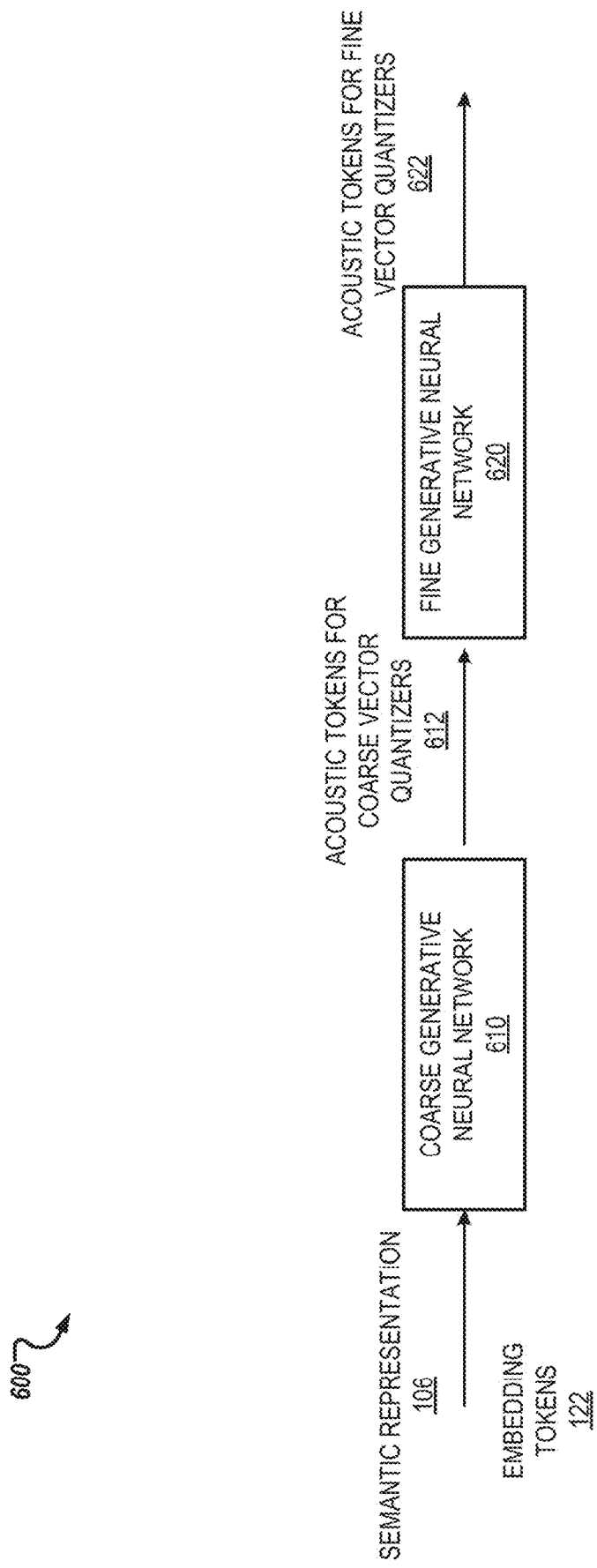
FIG. 6 is a diagram of an example process for generating acoustic tokens.

FIG. 6 is a diagram of an example process 600 for generating acoustic tokens. For convenience, the process 600 will be described as being performed by a system of one or more computers located in one or more locations. For example, an audio generation system, e.g., the audio generation system 100 of FIG. 1, appropriately programmed in accordance with this specification, can perform the process 600.

The process 600 is similar to the process 200 described above with reference to FIG. 2 in that the system can generate acoustic tokens for the acoustic representation using one or more generative neural networks such as a coarse generative neural network 610 and a fine generative neural network 620. The coarse generative neural network 610 is also referred to as the first generative neural network and is similar to the coarse generative neural network 210 described with reference to FIG. 2. The fine generative neural network 620 is also referred to as the second generative neural network and is similar to the fine generative neural network 620 described with reference to FIG. 2. The system can condition the generation of the acoustic representation on at least the semantic representation 106 and the embedding tokens 122, also referred to as the audio embedding tokens.

The encoder neural network can be part of a neural audio codec that includes a decoder neural network and an encoder neural network. As described in further detail below with reference to FIG. 8, the decoder neural network and the encoder neural network can be trained jointly. The coarse generative neural network 610 and fine generative neural network 620 can be trained to predict acoustic representations generated based on outputs of the vector quantizers of the neural audio codec.

In some implementations, the set of one or more respective acoustic tokens at each of the multiple second time steps includes multiple acoustic tokens that collectively represent a prediction of an output of a residual vector quantization applied to an embedding that represents acoustic properties of the audio signal at the second time step. The residual vector quantization encodes the embedding using a hierarchy of multiple vector quantizers that each generate a respective acoustic token from a corresponding vocabulary of acoustic tokens for the vector quantizer. The hierarchy includes one or more coarse vector quantizers at one or more first positions in the hierarchy and one or more fine vector quantizers at one or more last positions in the hierarchy. The set of acoustic tokens at each second time step includes, for each vector quantizer, a respective acoustic token selected from the vocabulary for the vector quantizer.

For example, the hierarchy can include Q vector quantizers, and the vector quantizers $1 \ldots Q'$ can be coarse vector quantizers, and the vector quantizers $(Q'+1) \ldots Q$ can be fine vector quantizers. The coarse vector quantizers generate coarse acoustic tokens, or acoustic tokens for coarse vector quantizers 612, that represent acoustic properties such as speaker identity and recording conditions. The fine vector quantizers generate fine acoustic tokens, or acoustic tokens for fine vector quantizers 622, that represent fine acoustic details. For example, fine acoustic tokens can be used to remove lossy compression artifacts in the coarse acoustic tokens. In some implementations, the number of first time steps and the number of second time steps that span the time window is less than the number of output time steps that span the time window. That is, the sampling rate of the encoder neural network that outputs respective embeddings at each of the second time steps can be lower than the sampling rate of the audio signal. In addition, the sampling rate of the audio representation neural network described with reference to FIG. 7 can be lower than the sampling rate of the audio signal. Thus the number of embeddings from which semantic tokens can be generated, and the number of embeddings from which acoustic tokens can be generated, can be less than the number of output time steps.

In some implementations, the number of first time steps that span the time window is less than the number of second time steps that span the time window. For example, for every semantic token, the system can generate two acoustic tokens for each coarse vector quantizer, and generate two acoustic tokens for each fine vector quantizer. That is, the sampling rate of the encoder neural network that outputs respective embeddings at each of the second time steps can be higher than that of the audio representation neural network described with reference to FIG. 7.

To generate the acoustic representation, the coarse generative neural network 610 can generate acoustic tokens for coarse vector quantizers 612 conditioned on at least the semantic representation 106 and the embedding tokens 122. In some examples, the embedding tokens 122 can include melody embedding tokens, also referred to as melody audio embedding tokens. In some examples, the embedding tokens 122 can be concatenated with melody embedding tokens.

For example, the coarse generative neural network 610 can generate, for each of the one or more coarse vector quantizers in the hierarchy, the respective acoustic tokens for the second time steps for the vector quantizer conditioned on at least the semantic representation 106 and the embedding tokens 122. The acoustic tokens for coarse vector quantizers 612 represent acoustic properties such as recording conditions.

The coarse generative neural network 610 can be an auto-regressive neural network that is configured to generate the acoustic tokens for coarse vector quantizers 612 auto-regressively according to a first generation order.

Each particular acoustic token for each particular coarse vector quantizer and at each particular second time step is conditioned on at least the semantic representation 106 and the embedding tokens 122 and any acoustic tokens that precede the particular acoustic token in the first generation order. Furthermore, each particular acoustic token for each particular coarse vector quantizer and at each particular second time step is preceded in the generation order by (i) any acoustic token for any of the coarse vector quantizers at any second time step that precedes the particular second time step and (ii) any acoustic tokens at the particular second time step for any coarse vector quantizers that precede the particular vector quantizer in the hierarchy.

For example, the hierarchy can include Q vector quantizers, and the vector quantizers $1 \ldots Q'$ can be coarse vector quantizers, while the vector quantizers $(Q'+1) \ldots Q$ can be fine vector quantizers. The acoustic token at a particular second time step t and a particular coarse vector quantizer $q \leq Q'$ is conditioned on all of the semantic tokens of the semantic representation 106, all of the embedding tokens 122, any acoustic tokens at second time steps preceding the second time step t and coarse vector quantizers preceding Q', and any acoustic tokens at the second time step t at coarse vector quantizers preceding the particular coarse vector quantizer q.

In some implementations, the coarse generative neural network 610 has a decoder-only Transformer architecture. In some implementations, the coarse generative neural network 610 has an encoder-decoder Transformer architecture.

To generate the acoustic representation, the fine generative neural network 620 can generate acoustic tokens for fine vector quantizers 622 conditioned on at least the acoustic tokens for coarse vector quantizers 612. For example, the fine generative neural network 620 can generate, for each of the one or more fine vector quantizers in the hierarchy, the respective acoustic tokens for the second time steps for the vector quantizer conditioned on the respective acoustic tokens for the second time steps for the one or more coarse vector quantizers in the hierarchy. The fine generative neural network 620 can thus not be conditioned on the semantic representation 106 and the embedding tokens 122. The acoustic tokens for fine vector quantizers 622 can be used to further improve audio quality, for example, by removing lossy compression artifacts.

The fine generative neural network 620 can be an auto-regressive neural network that is configured to generate the acoustic tokens auto-regressively according to a second generation order. Each particular acoustic token for each particular fine vector quantizer and at each particular second time step is conditioned on (i) the respective acoustic tokens for at least a subset of the second time steps for the one or more coarse vector quantizers and (ii) at least a subset of the acoustic tokens that precede the particular acoustic token in the second generation order. Each particular acoustic token for each particular fine vector quantizer and at each particular second time step is preceded in the second generation order by (i) any acoustic token for any of the fine vector quantizers at any second time step that precedes the particular second time step and (ii) any acoustic tokens at the particular second time step for any fine vector quantizers that precede the particular vector quantizer in the hierarchy.

For example, the hierarchy can include Q vector quantizers, and the vector quantizers (Q'+1) Q can be fine vector quantizers. The acoustic token at a particular second time step t and a particular fine vector quantizer q>Q' is conditioned on all of the acoustic tokens for the coarse vector quantizers 612, any acoustic tokens at second time steps preceding the second time step t and at fine vector quantizers following Q', and any acoustic tokens at the second time step t at coarse vector quantizers and fine vector quantizers preceding the particular fine vector quantizer q.

In some implementations, each particular acoustic token for each particular fine vector quantizer and at each particular second time step is conditioned on (i) the respective acoustic tokens for the one or more coarse vector quantizers that are at most a threshold number of second time steps before the second time step and (ii) any acoustic tokens that precede the particular second time step in the second generation order and that are at second time steps that are at most a threshold number of second time steps before the second time step. That is, the second time steps can be split into non-overlapping batches of successive second time steps.

For example, the acoustic token at a particular second time step t and a particular fine vector quantizer q>Q' is conditioned on acoustic tokens for the coarse vector quantizers 612 preceding the particular second time step t that are within the same corresponding batch of second time steps as the particular second time step t, and any acoustic tokens at second time steps preceding the second time step t within the corresponding batch and at fine vector quantizers following Q', and any acoustic tokens at the second time step t at coarse vector quantizers and fine vector quantizers preceding the particular fine vector quantizer q.

In some implementations, the fine generative neural network 620 has a decoder-only Transformer architecture. In some implementations, the fine generative neural network 620 has an encoder-decoder Transformer architecture.

In some implementations, the system can generate acoustic tokens for coarse vector quantizers 612 and acoustic tokens for fine vector quantizers 622 at once. For example, for a hierarchy of Q vector quantizers, the acoustic token at a particular second time step t for a particular coarse vector quantizer or fine vector quantizer q is conditioned on all of the acoustic tokens at second time steps preceding the second time step t and at vector quantizers preceding q, and any acoustic tokens at the second time step t at vector quantizers preceding the particular vector quantizer q.

The system can include the acoustic tokens for fine vector quantizers 622 in the acoustic representation. The system can use the acoustic representation to generate the prediction of the audio signal, as described below with reference to FIG. 7.

Figure 7:
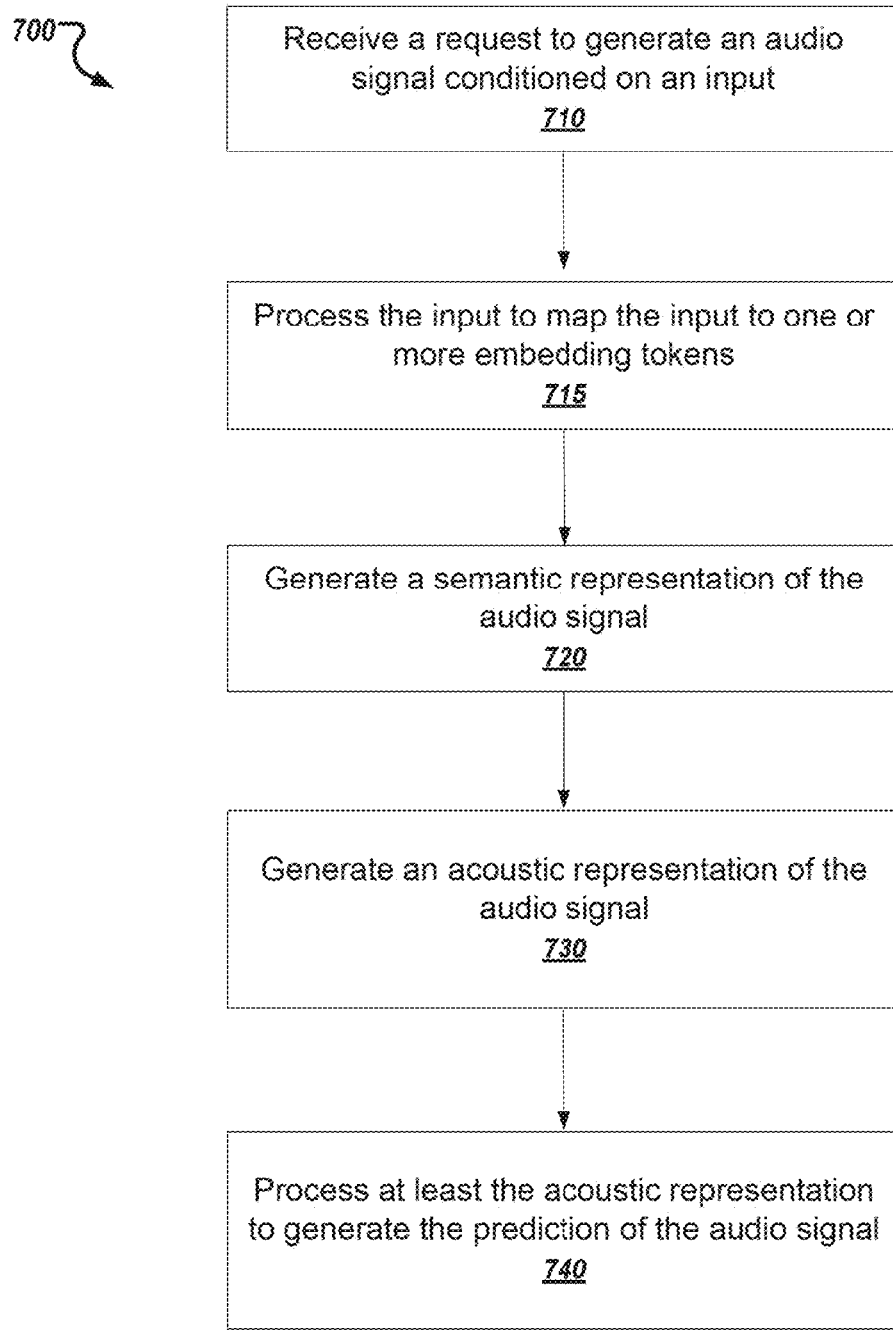
FIG. 7 is a flow diagram of an example process for generating a prediction of an audio signal.

FIG. 7 is a flow diagram of an example process 700 for generating a prediction of an audio signal. For convenience, the process 700 will be described as being performed by a system of one or more computers located in one or more locations. For example, an audio generation system, e.g., the audio generation system 100 of FIG. 1, appropriately programmed in accordance with this specification, can perform the process 700.

The system receives a request to generate an audio signal conditioned on an input (step 710). The audio signal has a respective audio sample at each of multiple output time steps spanning a time window. The audio signal can be conditioned on the input. The input can be included in a context that is specified in the request, for example. The input can include an input audio signal, visual data, and/or text data.

In examples where the input includes text data such as a sequence of text, the prediction of the audio signal can be a prediction of music that is described by the sequence of text. In some examples, the sequence of text can include multiple subsequences of text. The prediction of the audio signal can be a prediction of music with sections of music that correspond to each of the subsequences and reflect each of the subsequences.

In examples where the input includes text data and an input audio signal representing a melody, the prediction of the audio signal can be a prediction of music that is described by the sequence of text and follows the melody.

In examples where the input includes an input audio signal representing a melody, the prediction of the audio signal can be a prediction of music that follows the melody. For example, the input audio signal can represent whistling or humming.

In examples where the input includes an input audio signal representing music, the prediction of the audio signal can be a continuation of the input audio signal.

In some examples where the input includes visual data, the system can obtain a text description of the visual data. In some implementations, the system can generate the text description of the visual data. The prediction of the audio signal can be a prediction of music that is described by the text description.

The system processes the input to map the input to one or more embedding tokens (step 715). The embedding tokens are also referred to as audio embedding tokens. The system can process the input using an embedding neural network. For example, the system can generate an embedding vector for the input using the embedding neural network and quantize the embedding vector to generate embedding tokens.

In some examples, the input includes a sequence of text. The embedding neural network can have been trained to map text and audio to a joint embedding space, also referred to as a joint audio embedding space. In examples where the input includes a sequence of text, the embedding tokens are generated from the text.

The embedding neural network can have been trained on training data including audio signals. The training of the embedding neural network is described in further detail below with reference to FIG. 8.

In some examples the input can include multiple subsequences of text. In these examples, the system can generate embedding tokens for each subsequence and thus change the conditioning signal for each subsequence when generating the semantic representation and acoustic representation.

In some examples, the input includes a sequence of text and an input audio signal representing a melody. The system can process the input audio signal using a melody embedding neural network to map the input audio signal to one or more melody embedding tokens, also referred to as melody audio embedding tokens. The system can then concatenate the melody embedding tokens with the embedding tokens.

In some examples, the input includes an input audio signal representing a melody. The system can process the input audio signal using a melody embedding neural network to map the audio signal to one or more melody embedding tokens. The system can use the melody embedding tokens as the embedding tokens to be used as conditioning for generating the semantic and acoustic representations.

In these examples where the input audio signal represents a melody, to process the input audio signal using a melody embedding neural network, the system can generate one or more melody embedding vectors for the input audio signal in a joint embedding space, also referred to as a joint audio embedding space, using the melody embedding neural network. In some implementations, the melody embedding neural network can be a vision transformer (ViT) that receives temporal frames of the mel spectrogram of the input audio signal and generates the melody embedding vectors for the input audio signal.

The system can quantize the melody embedding vectors to generate melody embedding tokens. For example, the system can use residual vector quantization to quantize the melody embedding vectors into melody embedding tokens. The training of the melody embedding neural network is described in further detail below with reference to FIG. 8.

The system generates a semantic representation of the audio signal (step 720). The semantic representation specifies a respective semantic token at each of multiple first time steps spanning the time window. Each semantic token is selected from a vocabulary of semantic tokens conditioned on the embedding tokens and represents semantic content of the audio signal at the corresponding first time step.

In some implementations, the system can generate the semantic representation auto-regressively using a semantic representation generative neural network with embedding tokens as a conditioning signal. The semantic representation generative neural network can also be referred to as a third generative neural network and is similar to the semantic representation generative neural network described above with reference to FIG. 3.

For example, the semantic representation generative neural network can be trained to auto-regressively generate semantic tokens one after the other. The semantic representation generative neural network can be, e.g., a decoder only or an encoder-decoder Transformer-based neural network. For example, the semantic representation generative neural network can have been trained to predict semantic representations generated based on outputs of one or more layers, e.g., of one of the intermediate layers, of an audio representation neural network.

The audio representation neural network can generate outputs or embeddings at regular intervals of time. For example, the audio representation neural network can generate one embedding for every 40 ms of the input audio signal.

The training of the semantic representation generative neural network and the audio representation neural network is described in further detail below with reference to FIG. 8.

In some examples, the input includes a sequence of text and the embedding tokens are generated from the text. In these examples, the system can condition the semantic representation generative neural network on at least the embedding tokens while auto-regressively generating the semantic representation of the audio signal.

In some examples, the input can include multiple subsequences of text, and the embedding tokens include embedding tokens for each subsequence. For example, for a first subsequence, the system can condition the semantic representation generative neural network on the embedding tokens for the first subsequence while auto-regressively generating the semantic representation of the audio signal. For a second subsequence, the system can condition the semantic representation generative neural network on the embedding tokens for the second subsequence and the semantic tokens generated for the first subsequence.

In some examples, the input includes a sequence of text and an input audio signal representing a melody, and the embedding tokens are generated from the text, and the melody embedding tokens are generated from the input audio signal. The system can concatenate the melody embedding tokens with the embedding tokens. The system can select each semantic token from a vocabulary of semantic tokens conditioned on the melody embedding tokens and embedding tokens. The system can condition the semantic representation generative neural network on the embedding tokens and the melody embedding tokens while auto-regressively generating the semantic representation of the audio signal.

In some examples, the input includes an input audio signal representing a melody and melody embedding tokens are generated from the input audio signal. In these examples, the system can use the melody embedding tokens as the embedding tokens. The system can select each semantic token from a vocabulary of semantic tokens conditioned on the embedding tokens. The system can condition the semantic representation generative neural network on the embedding tokens while auto-regressively generating the semantic representation of the audio signal.

In some examples, the system can generate a prediction of an audio signal that is longer than the audio signals the system was trained on. For example, the system can be trained on audio signals of 30 seconds. To generate longer audio signals, the semantic representation generative neural network can advance with a stride of 15 seconds, using 15 seconds as a prefix to generate an additional 15 seconds, while conditioned on the same embedding tokens from the input text.

The system generates an acoustic representation of the audio signal (step 730). The system can generate the acoustic representation using one or more generative neural networks and conditioned on at least the semantic representation and the embedding tokens. The acoustic representation specifies a set of one or more respective acoustic tokens at each of multiple second time steps spanning the time window. The one or more respective acoustic tokens at each second time step represent acoustic properties of the audio signal at the corresponding second time step. Generating the acoustic representation is described in further detail above with reference to FIG. 6.

In some implementations, the input includes a sequence of text. The one or more generative neural networks can have been trained at least in part on audio-only training data. During training, the semantic representations and the acoustic representations are conditioned on embeddings of audio inputs in a joint embedding space for text and audio. Training is described in further detail below with reference to FIG. 8.

The system processes at least the acoustic representation to generate the prediction of the audio signal (step 740). The system can process the acoustic representation using the decoder neural network. For example, the respective audio sample at each of multiple output time steps spanning the time window can be based on one or more acoustic tokens for every vector quantizer in the hierarchy.

In some implementations, a number of first time steps and a number of second time steps that span the time window is less than the number of output time steps that span the time window. In some implementations, the number of first time steps that span the time window is less than the number of second time steps that span the time window, as described in further detail above with reference to FIG. 6.

Figure 8:
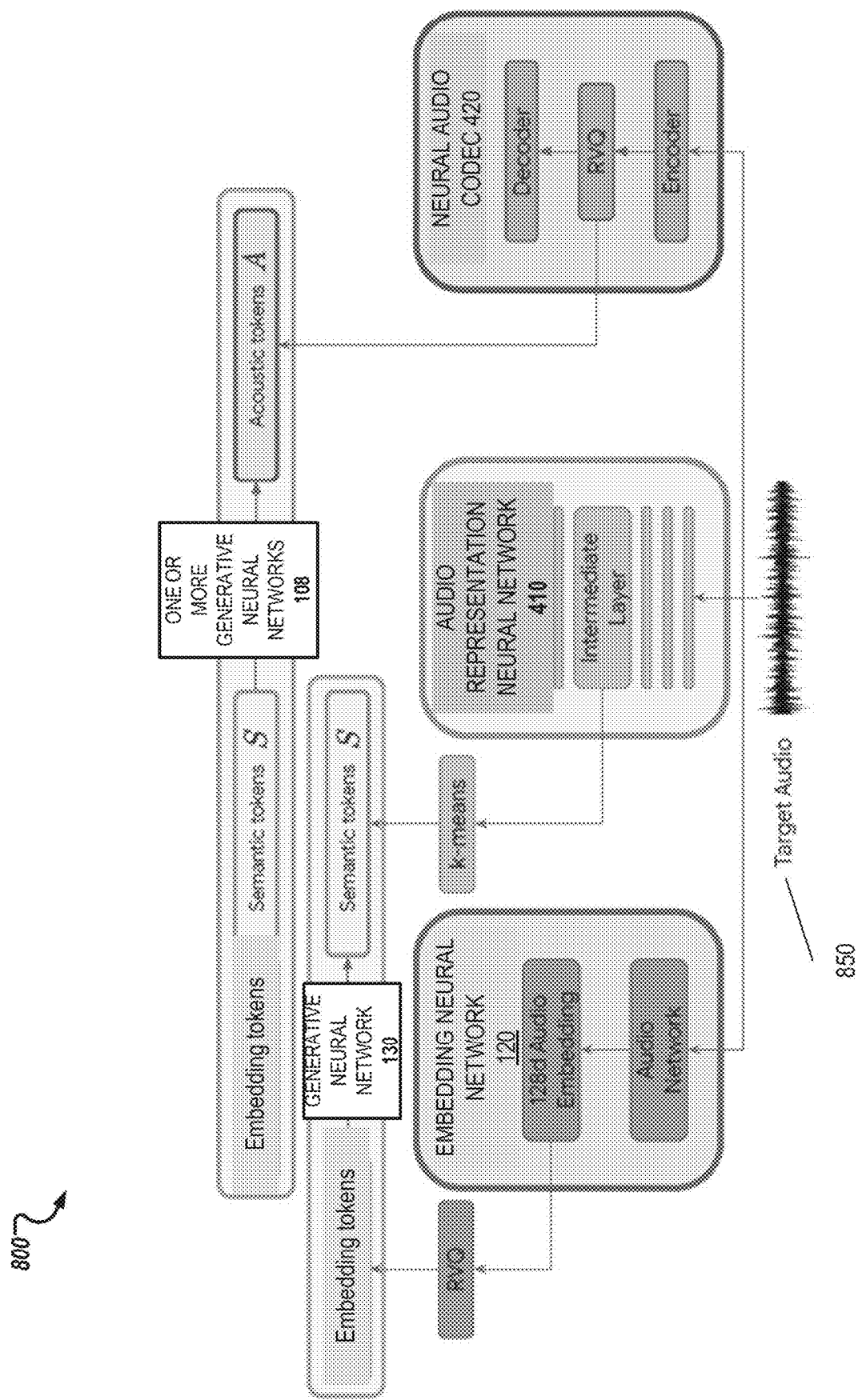
FIG. 8 is a diagram of an example process for training an example audio generation system.

FIG. 8 is a diagram of an example process 800 for training an example audio generation system. For convenience, the process 800 will be described as being performed by a training system of one or more computers located in one or more locations.

The process 800 is similar to the process 400 described with reference to FIG. 4 in that the training system can train an audio generation system such as the audio generation system 100 of FIG. 1 on training data. In some implementations, the components of the audio generation system such as the embedding neural network 120, semantic representation generative neural network 130 (shown in FIG. 4 as "generative neural network 130"), one or more generative neural networks 108, neural audio codec 420, and audio representation neural network 410 can be trained independently.

The embedding neural network 120 can be a joint embedding model with two embedding towers, one for text, and one for music. The embedding neural network 120 can be a MuLan model, for example. The towers map text and music to a shared embedding space using contrastive learning. The text network can be a BERT pre-trained on a large corpus of text-only data. The music network can be a residual convolutional network, for example.

The embedding neural network 120 can be trained on training data that includes audio signals. For example, the training data can include pairs of music clips and corresponding text annotations. The embedding neural network 120 can be trained to link music to unconstrained natural language descriptions. For example, the embedding neural network 120 can be trained on an objective so that text that describes audio signals, and the corresponding audio signals, have embeddings that are close to each other in the joint embedding space for audio and text.

In some implementations, the embedding neural network 120 can be pre-trained and frozen prior to the training of the audio generation system.

Because the audio generation system can be trained on training data that is audio-only, the training data can easily be scaled. The training data is not limited to audio data with text captions. Furthermore, by training the embedding neural network 120 on contrastive loss, the robustness to noisy text descriptions can be increased.

To generate embedding tokens for training the audio generation system, the training system can provide a target audio signal 850 to the embedding neural network 120. The embedding neural network 120 can generate a representation of the target audio signal 850 in the joint embedding space. The training system can quantize the representation into discrete embedding tokens. The embedding tokens are based on embeddings of the target audio signal 850 in the joint embedding space.

In some implementations, the training data can include longer audio signals than the audio signals the embedding neural network 120 was pre-trained to operate on. For example, the target audio signal 850 can have a length of 30 seconds, and the embedding neural network 120 can have been pre-trained to operate on sequences of 10 seconds. The training system can use the embedding neural network 120 to calculate representations on 10-second windows of the target audio signal 850, with a 1-second stride, and average the resulting representations. The training system can then quantize the averaged representations into discrete embedding tokens for the target audio signal 850.

The training system can train the neural audio codec 420 and the audio representation neural network 410 on training data that includes audio clips such as music clips. An example audio clip of the training data is shown in FIG. 8 as target audio 850.

As described above with reference to FIG. 4, the neural audio codec 420 can include a decoder neural network and an encoder neural network. For example, the encoder neural network can convert the target audio 850 into a coded signal which is quantized into an acoustic representation. The decoder neural network can convert the acoustic representation into a predicted audio signal. In some implementations, the neural audio codec 420 can be pre-trained and frozen prior to the training of the audio generation system.

The neural audio codec 420 can be trained to minimize adversarial and reconstruction loss. For example, the decoder neural network and the encoder neural network can be trained jointly on an objective that measures reconstruction quality of predicted audio signals generated by the decoder neural network from acoustic representations generated using outputs generated by the encoder neural network.

The audio representation neural network 410 can have been trained to generate representations of input audio signals. In some implementations, the audio representation neural network 410 can be pre-trained and frozen prior to the training of the audio generation system. The audio representation neural network 410 can be trained to minimize masked language model (MLM) loss and contrastive loss. The audio representation neural network 410 can be a w2v-BERT model, for example.

The training system can train the semantic representation generative neural network 130 and the one or more generative neural networks 108 on training data that includes audio clips. In some implementations, the generative neural networks can be trained with teacher-forcing.

The training system can train the semantic representation generative neural network 130 to predict semantic representations generated based on outputs of one or more layers, e.g., of one of the intermediate layers, of the audio representation neural network 410. The training system can train the semantic representation generative neural network 130 conditioned on the embedding tokens. The semantic representation generative neural network 130 can model the distribution $p(S_t|S_{<t}, M_A)$ where $S_t$ represents a semantic token at a first time step t, and M A represents the embedding tokens generated from audio.

For example, the audio representation neural network 410 can include networks with multiple layers. For example, the audio representation neural network 410 can include a self-attention based model, e.g., a Transformer-based model or a Conformer-based model with multiple layers.

The self-attention based model can have been trained on a music representation task, e.g., through self-supervised learning.

The outputs of the one or more layers of the audio representation neural network 410 can include embeddings of input audio. For example, the self-attention based model can generate dense embeddings for some or all of the audio samples in the training data. The embeddings for an intermediate layer of the self-attention based model for some or all of the audio samples can be clustered by k-means into K clusters. The centroids of the clusters can be used as semantic tokens. In some implementations, the outputs can be normalized so that each dimension has zero mean and unit variance before clustering.

An example target semantic representation for the training of the semantic representation generative neural network 130 can have been generated by providing the target audio 450 to the self-attention based model. The training system can generate the semantic tokens of the target semantic representation by assigning each output for the target audio 450 to the centroid of the nearest cluster.

In some implementations, consecutive repetitions of semantic tokens within the target semantic representations can be removed. For example, a target semantic representation for the target audio 850 includes a sequence of semantic tokens. The training system can remove consecutive repeating semantic tokens in the sequence, and then use the target semantic representation without consecutive repeating semantic tokens for training.

The training system can train the one or more generative neural networks 108 to generate an acoustic representation conditioned at least on a semantic representation and the embedding tokens. In some implementations, the acoustic representation is a prediction of a ground truth acoustic representation that would be generated from outputs of an encoder neural network by processing the audio signal. For example, the encoder neural network can be a convolutional encoder that maps the audio signal to a sequence of embeddings. Each respective embedding at each of multiple second time steps can correspond to features of the audio signal at the second time step. The ground truth acoustic representation can be generated by applying quantization to each of the respective embeddings. As described above, the encoder neural network can be part of a neural audio codec such as the neural audio codec.

For example, the quantization can be residual vector quantization that encodes each embedding using a hierarchy of multiple vector quantizers that each generate a respective acoustic token from a corresponding vocabulary of acoustic tokens for the vector quantizer. The hierarchy can include one or more coarse vector quantizers at one or more first positions in the hierarchy and one or more fine vector quantizers at one or more last positions in the hierarchy. The set of one or more respective acoustic tokens at each second time step can include, for each vector quantizer, a respective acoustic token selected from the vocabulary for the vector quantizer and being a prediction of a ground truth acoustic token that would be generated by the vector quantizer from a ground truth embedding generated by the encoder neural network at the second time step.

The training system can train the one or more generative neural networks 108 to predict acoustic representations generated based on outputs of the residual vector quantizer of the neural audio codec 420. The training system can train the one or more generative neural networks 408 conditioned on the embedding tokens. The one or more generative neural networks 408 can model the distribution $p(A_t|A_{<t}, S, M_A)$ where $A_t$ represents an acoustic token at a first time step t, S represents the semantic representation, and $M_A$ represents the embedding tokens generated from audio.

The target acoustic representations for the training of the one or more generative neural networks 108 can have been generated by applying quantization to each of the respective embeddings outputted by the encoder neural network of the neural audio codec 420 at each of multiple second time steps. The quantization can be a residual vector quantization (RVQ) as described above with reference to FIG. 6.

In some implementations, the audio generation system also includes a melody embedding neural network. The melody embedding neural network can have been trained on audio pairs of matching melodies but different acoustics. For example, the training data can include different versions of the same music clip, such as covers, instrumentals, vocals, humming, and singing.

The melody embedding neural network can be trained so that when two audio clips contain the same melody, the corresponding embeddings in the joint embedding space, also referred to as the joint audio embedding space, are close to each other. For example, the melody embedding neural network can be trained using semi-hard triplet loss to generate embeddings for audio that are representative of a melody in the input audio signal while being invariant to acoustic properties related to the instruments being played.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method for generating a prediction of an audio signal, the method comprising:
    receiving a request to generate an audio signal having a respective audio sample at each of a plurality of output time steps spanning a time window conditioned on an input;
    processing the input using an embedding neural network to map the input to one or more embedding tokens;
    generating a semantic representation of the audio signal that specifies a respective semantic token at each of a plurality of first time steps spanning the time window, each semantic token being selected from a vocabulary of semantic tokens conditioned on the embedding tokens and representing semantic content of the audio signal at the corresponding first time step;
    generating, using one or more generative neural networks and conditioned on at least the semantic representation and the embedding tokens, an acoustic representation of the audio signal, the acoustic representation specifying a set of one or more respective acoustic tokens at each of a plurality of second time steps spanning the time window, the one or more respective acoustic tokens at each second time step representing acoustic properties of the audio signal at the corresponding second time step; and
    processing at least the acoustic representation using a decoder neural network to generate the prediction of the audio signal.

2. The method of claim 1, wherein processing the input using an embedding neural network to map the input to one or more embedding tokens comprises:
    generating an embedding vector for the input in a joint embedding space using the embedding neural network; and
    quantizing the embedding vector to generate embedding tokens.

3. The method of claim 1, wherein the input comprises a sequence of text, and wherein the embedding neural network has been trained to map text and audio to a joint embedding space.

4. The method of claim 3, wherein the sequence of text comprises a plurality of subsequences of text, and the prediction of the audio signal is a prediction of music with sections of music that correspond to each of the subsequences and reflect each of the subsequences.

5. The method of claim 1, wherein the input comprises a sequence of text, and the prediction of the audio signal is a prediction of music that is described by the sequence of text.

6. The method of claim 5, wherein the input further comprises an audio signal representing a melody, and the prediction of the audio signal is a prediction of music that is described by the sequence of text and follows the melody.

7. The method of claim 6, wherein the method further comprises:
    processing the audio signal using a melody embedding neural network to map the audio signal to one or more melody embedding tokens; and
    concatenating the melody embedding tokens with the embedding tokens.

8. The method of claim 7, wherein processing the audio signal using a melody embedding neural network to map the audio signal to one or more melody embedding tokens comprises:
    generating one or more melody embedding vectors for the audio signal in a joint embedding space using the melody embedding neural network; and
    quantizing the one or more melody embedding vectors to generate melody embedding tokens.

9. The method of claim 1, wherein the input comprises an audio signal representing a melody, and the prediction of the audio signal is a prediction of music that follows the melody.

10. The method of claim 9, wherein the method further comprises:
    processing the audio signal using a melody embedding neural network to map the audio signal to one or more melody embedding tokens; and
    wherein each semantic token is selected from a vocabulary of semantic tokens conditioned on the melody embedding tokens.

11. The method of claim 1, wherein the embedding neural network is trained on training data comprising audio signals.

12. The method of claim 1, wherein the embedding neural network has been trained on an objective so that text that describes audio signals, and the corresponding audio signals, have embeddings that are close to each other in a joint embedding space.

13. The method of claim 1, wherein the decoder neural network is a decoder neural network of a neural audio codec that has been trained jointly with an encoder neural network on an objective that measures reconstruction quality of predicted audio signals generated by the decoder neural network from acoustic representations generated using outputs generated by the encoder neural network.

14. The method of claim 1, wherein the acoustic representation is a prediction of a ground truth acoustic representation that would be generated from outputs of an encoder neural network by processing the audio signal.

15. The method of claim 14, wherein the encoder neural network outputs a respective embedding at each of the plurality of second time steps, and wherein the ground truth acoustic representation is generated by applying quantization to each of the respective embeddings.

16. The method of claim 15, wherein:
the quantization is residual vector quantization that encodes each embedding using a hierarchy of a plurality of vector quantizers that each generate a respective acoustic token from a corresponding vocabulary of acoustic tokens for the vector quantizer, wherein the hierarchy comprises one or more coarse vector quantizers at one or more first positions in the hierarchy and one or more fine vector quantizers at one or more last positions in the hierarchy, and
the set of one or more respective acoustic tokens at each second time step comprise, for each vector quantizer, a respective acoustic token selected from the vocabulary for the vector quantizer and being a prediction of a ground truth acoustic token that would be generated by the vector quantizer from a ground truth embedding generated by the encoder neural network at the second time step.

17. The method of claim 1, wherein:
the set of one or more respective acoustic tokens at each of the plurality of second time steps comprises a plurality of acoustic tokens that collectively represent a prediction of an output of a residual vector quantization applied to an embedding that represents acoustic properties of the audio signal at the second time step,
the residual vector quantization encodes the embedding using a hierarchy of a plurality of vector quantizers that each generate a respective acoustic token from a corresponding vocabulary of acoustic tokens for the vector quantizer, wherein the hierarchy comprises one or more coarse vector quantizers at one or more first positions in the hierarchy and one or more fine vector quantizers at one or more last positions in the hierarchy, and
the set of acoustic tokens at each second time step comprises, for each vector quantizer, a respective acoustic token selected from the vocabulary for the vector quantizer.

18. The method of claim 17, wherein generating, using one or more generative neural networks and conditioned on at least the semantic representation and the embedding tokens, an acoustic representation of the audio signal comprises:
generating, using a first generative neural network and for each of the one or more coarse vector quantizers in the hierarchy, the respective acoustic tokens for the second time steps for the coarse vector quantizer conditioned on at least the semantic representation and the embedding tokens.

19. The method of claim 18, wherein the first generative neural network is an auto-regressive neural network that is configured to generate the acoustic tokens auto-regressively according to a first generation order, and wherein each particular acoustic token for each particular coarse vector quantizer and at each particular second time step is conditioned on at least the semantic representation and the embedding tokens and any acoustic tokens that precede the particular acoustic token in the first generation order.

20. The method of claim 19, wherein each particular acoustic token for each particular coarse vector quantizer and at each particular second time step is preceded in the first generation order by (i) any acoustic token for any of the coarse vector quantizers at any second time step that precedes the particular second time step and (ii) any acoustic tokens at the particular second time step for any coarse vector quantizers that precede the particular coarse vector quantizer in the hierarchy.

21. The method of claim 18, wherein the first generative neural network has a decoder-only Transformer architecture or an encoder-decoder Transformer architecture.

22. The method of claim 18, wherein generating, using one or more generative neural networks and conditioned on at least the semantic representation and the embedding tokens, an acoustic representation of the audio signal comprises:
generating, using a second generative neural network and for each of the one or more fine vector quantizers in the hierarchy, the respective acoustic tokens for the second time steps for the fine vector quantizer conditioned on the respective acoustic tokens for the second time steps for the one or more coarse vector quantizers in the hierarchy.

23. The method of claim 22, wherein the second generative neural network is not conditioned on the semantic representation and the embedding tokens.

24. The method of claim 22, wherein the second generative neural network is an auto-regressive neural network that is configured to generate the acoustic tokens auto-regressively according to a second generation order, and wherein each particular acoustic token for each particular fine vector quantizer and at each particular second time step is conditioned on (i) the respective acoustic tokens for at least a subset of the second time steps for the one or more coarse vector quantizers (ii) at least a subset of the acoustic tokens that precede the particular acoustic token in the second generation order.

25. The method of claim 24, wherein each particular acoustic token for each particular fine vector quantizer and at each particular second time step is preceded in the second generation order by (i) any acoustic token for any of the fine vector quantizers at any second time step that precedes the particular second time step and (ii) any acoustic tokens at the particular second time step for any fine vector quantizers that precede the particular fine vector quantizer in the hierarchy.

26. The method of claim 24, wherein each particular acoustic token for each particular fine vector quantizer and at each particular second time step is conditioned on (i) the respective acoustic tokens for the one or more coarse vector quantizers that are at most a threshold number of second time steps before the second time step and (ii) any acoustic tokens that precede the particular second time step in the second generation order and that are at second time steps that are at most a threshold number of second time steps before the second time step.

27. The method of claim 1, wherein generating a semantic representation of the audio signal comprises:
generating the semantic representation auto-regressively using a third generative neural network with embedding tokens as a conditioning signal.

28. The method of claim 1, wherein the input comprises a sequence of text, embeddings are embeddings in a joint embedding space, wherein the one or more generative neural networks have been trained at least in part on audio-only training data, wherein during training, the semantic representations and the acoustic representations are conditioned on embeddings of audio inputs in the joint embedding space.

29. A system comprising one or more computers and one or more storage devices storing instructions that, when executed by the one or more computers, cause the one or more computers to perform operations comprising a method for generating a prediction of an audio signal, the method comprising:

receiving a request to generate an audio signal having a respective audio sample at each of a plurality of output time steps spanning a time window conditioned on an input;

processing the input using an embedding neural network to map the input to one or more embedding tokens;

generating a semantic representation of the audio signal that specifies a respective semantic token at each of a plurality of first time steps spanning the time window, each semantic token being selected from a vocabulary of semantic tokens conditioned on the embedding tokens and representing semantic content of the audio signal at the corresponding first time step;

generating, using one or more generative neural networks and conditioned on at least the semantic representation and the embedding tokens, an acoustic representation of the audio signal, the acoustic representation specifying a set of one or more respective acoustic tokens at each of a plurality of second time steps spanning the time window, the one or more respective acoustic tokens at each second time step representing acoustic properties of the audio signal at the corresponding second time step; and processing at least the acoustic representation using a decoder neural network to generate the prediction of the audio signal.

30. One or more computer-readable storage media storing instructions that when executed by one or more computers cause the one or more computers to perform operations comprising a method for generating a prediction of an audio signal, the method comprising:

receiving a request to generate an audio signal having a respective audio sample at each of a plurality of output time steps spanning a time window conditioned on an input;

processing the input using an embedding neural network to map the input to one or more embedding tokens;

generating a semantic representation of the audio signal that specifies a respective semantic token at each of a plurality of first time steps spanning the time window, each semantic token being selected from a vocabulary of semantic tokens conditioned on the embedding tokens and representing semantic content of the audio signal at the corresponding first time step;

generating, using one or more generative neural networks and conditioned on at least the semantic representation and the embedding tokens, an acoustic representation of the audio signal, the acoustic representation specifying a set of one or more respective acoustic tokens at each of a plurality of second time steps spanning the time window, the one or more respective acoustic tokens at each second time step representing acoustic properties of the audio signal at the corresponding second time step; and processing at least the acoustic representation using a decoder neural network to generate the prediction of the audio signal.

* * * * *